US008548069B2

(12) United States Patent
Suenaga et al.

(10) Patent No.: US 8,548,069 B2
(45) Date of Patent: Oct. 1, 2013

(54) DATA TRANSMISSION SYSTEM CAPABLE OF TRANSMITTING INTERRUPT SIGNAL WITHOUT INTERRUPT GATE PERIOD

(75) Inventors: Hiroshi Suenaga, Osaka (JP); Osamu Shibata, Hyogo (JP); Yoshiyuki Saito, Osaka (JP); Kohei Masuda, Osaka (JP); Yoshihide Komatsu, Osaka (JP); Masashi Suzuki, Shiga (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 13/142,655

(22) PCT Filed: Oct. 13, 2010

(86) PCT No.: PCT/JP2010/006075
§ 371 (c)(1),
(2), (4) Date: Jun. 29, 2011

(87) PCT Pub. No.: WO2011/052141
PCT Pub. Date: May 5, 2011

(65) Prior Publication Data
US 2011/0280322 A1 Nov. 17, 2011

(30) Foreign Application Priority Data

Oct. 29, 2009 (JP) .................................. 2009-248716

(51) Int. Cl.
*H04B 3/00* (2006.01)
(52) U.S. Cl.
USPC ............. 375/257; 375/377; 375/288; 333/12; 326/33; 326/30
(58) Field of Classification Search
USPC ............. 375/257, 377, 288; 333/12; 326/30, 326/33; 327/307
See application file for complete search history.

(56) References Cited

U.S. PATENT DOCUMENTS 5,517,487 A 5/1996 Fridland et al.
6,166,563 A * 12/2000 Volk et al. ....................... 326/87

(Continued)

FOREIGN PATENT DOCUMENTS

JP 1-245733 9/1989
JP 7-240757 9/1995
WO 2007/125670 11/2007

OTHER PUBLICATIONS

International Search Report issued Jan. 18, 2011 in International (PCT) Application No. PCT/JP2010/006075.

(Continued)

*Primary Examiner* — Kenneth Lam
(74) *Attorney, Agent, or Firm* — Wenderoth, Lind & Ponack, L.L.P.

(57) ABSTRACT

A data transmission system comprises: a pair of transmission lines connecting a plurality of apparatuses; a bridge termination resistor connected between the transmission lines and having a resistance value matching a differential impedance of the transmission lines; a first switch connecting the bridge termination resistor to the transmission lines when being turned on, and disconnecting the bridge termination resistor from the transmission lines when being turned off; pull-up/down resistors connected between the transmission lines and a fixed voltage node, and having resistance values respectively matching characteristic impedances of the transmission lines, the fixed voltage node being a power supply or a ground; and second switches connecting the pull-up/down resistors between the transmission lines and the fixed voltage node when being turned on, and disconnecting the pull-up/down resistors from the transmission lines when being turned off.

23 Claims, 16 Drawing Sheets

(56) References Cited

U.S. PATENT DOCUMENTS

| | | | |
|---|---|---|---|
| 6,356,106 B1 * | 3/2002 | Greeff et al. | 326/30 |
| 6,525,559 B1 * | 2/2003 | Wu et al. | 326/30 |
| 6,605,958 B2 * | 8/2003 | Bergman et al. | 326/30 |
| 6,686,763 B1 * | 2/2004 | Yen | 326/30 |
| 7,157,931 B2 * | 1/2007 | Song | 326/30 |
| 7,500,027 B2 * | 3/2009 | Wu | 710/15 |
| 7,656,198 B1 * | 2/2010 | Zhou et al. | 326/115 |
| 7,898,295 B1 * | 3/2011 | Kasturirangan et al. | 326/86 |
| 2003/0080891 A1 * | 5/2003 | Nagano | 341/155 |
| 2008/0007289 A1 * | 1/2008 | Kimura | 326/30 |
| 2009/0290582 A1 | 11/2009 | Suenaga et al. | |

OTHER PUBLICATIONS

International Preliminary Report on Patentability issued Jun. 21, 2012 in International (PCT) Application No. PCT/JP2010/006075.

* cited by examiner

DATA TRANSMISSION SYSTEM CAPABLE OF TRANSMITTING INTERRUPT SIGNAL WITHOUT INTERRUPT GATE PERIOD

TECHNICAL FIELD

The present invention relates to a data transmission system for data transmission using differential signals.

BACKGROUND ART

Some data transmission systems used in data communication apparatuses adopt bus standards, e.g., USB (Universal Serial Bus), IEEE (Institute of Electrical and Electronics Engineers) 1394, etc. Such transmission systems include a plurality of signal lines.

In general, a data transmission system is provided for a plurality of apparatuses communicating data with each other, and is used as a system for data communication among them. For example, a data transmission system is used for data communication between a computer operable as a host device, and an information storage terminal connected to the computer, such as an SD card, a USB memory, or an external hard disk. The capacity of such an information storage terminal is increasing year by year, which in turn allows to handle large amounts of data.

In order to comfortably use a large-capacity information storage terminal, it is necessary to significantly increase data transmission rate. In addition, various electrical appliances are being diversified, and they may work in cooperation with each other. Hence, it is possible to suppose a case in which various electrical appliances each including information storage medium perform data transmission to each other. Also in such a case, a high-speed data transmission scheme for the respective devices is required.

There is a transmission scheme for high-speed data transmission, called a "differential transmission scheme". According to the differential transmission scheme, a pair of signals of opposite phases are transmitted over a pair of transmission lines, respectively, thus generating a signal from a difference between the pair of signals. According to the differential transmission scheme, since the signal amplitudes can be reduced, the signal frequency can be made faster. In addition, since a signal is generated from a difference between the pair of signals of opposite phases, the differential transmission scheme is characterized by being highly resistant to noise (common mode noise). In addition, since the pair of signals of opposite phases are transmitted over the pair of transmission lines, magnetic fields generated from the respective transmission lines are cancelled out, and thus, the differential transmission scheme is characterized in that unwanted radiation noise is less likely to be generated.

In the case of a data transmission system using the differential transmission scheme, in general, a termination resistor is connected to respective signal lines in order to prevent signal reflections, the termination resistor having a resistance value that match a differential impedance of the signal lines.

Meanwhile, in data transmission between a plurality of apparatuses, when a plurality of signal lines provided between the apparatuses are used as signal lines for communication in one direction at a time, there is a need for a means of transmitting, during data transmission, an interrupt signal such as a control signal for requesting to stop the transmission.

As a data transmission method that allows to transmit an interrupt signal during data transmission, there is a transmission method disclosed in Patent Document 1. According to Patent Document 1, when data is transmitted from a transmitting apparatus to a receiving apparatus through a single transmission path, the transmitting apparatus transmits packets such that an interrupt gate period (time slot) is provided between packets transmitted. The receiving apparatus can transmit an interrupt signal (e.g., a signal for requesting to stop transmission) to the transmitting apparatus during the interrupt gate period.

However, according to the transmission method of Patent Document 1, it is necessary to allocate an interrupt gate period having a bit length equal to or greater than that of an interrupt signal, and it is also necessary to provide an interrupt gate period between packets even when actually requiring no interrupt. Hence, it creates a problem of degradation in the transmission efficiency of the transmitting apparatus.

As a transmission method that solves the problem, there is a scheme disclosed in Patent Document 2. According to Patent Document 2, a change in the termination resistance value at a receiving apparatus results in a change in the amplitudes of differential signals, and the latter change is used as an interrupt signal. With reference to FIG. 20, the signal transmission method disclosed in Patent Document 2 will be described.

An apparatus A is a transmitting apparatus, and an apparatus B is a receiving apparatus. Referring to FIG. 20, the receiving apparatus B is provided with a resistor having a variable resistance value, as a termination resistor 73a for a signal line D0. The apparatus B is further provided with a circuit 82 for changing the resistance value of the termination resistor 73a. The apparatus A is provided with a circuit 84 for detecting amplitudes of differential signals in the transmitting apparatus of the signal line D0.

Each of the apparatuses A and B is operable as either of a transmitting apparatus and a receiving apparatus. Hence, the apparatus A is provided with a termination resistor 72a having a variable resistance value, and a circuit 83 for changing the resistance value of the termination resistor 72a, and the apparatus B is provided with a circuit 85 for detecting amplitudes of differential signals.

In order to transmit an interrupt signal from the receiving apparatus to the transmitting apparatus in this configuration, the termination resistance value at the receiving apparatus (B/A) is decreased. The decrease in the termination resistance value results in a change in the amplitudes of differential signals. The changes in the differential signals can be detected by the transmitting apparatus (A/B). The change in the amplitudes of the differential signals is used as an interrupt signal. For example, the configuration can be such that, when the transmitting apparatus (A/B) has detected changes in the amplitudes of differential signals, the transmitting apparatus (A/B) stops data transmission and waits for a response from the receiving apparatus (B/A). In addition, the beginning (header) and end (footer) of a packet are usually assigned a predetermined signal string portion. The receiving apparatus (B/A) changes the amplitudes of the differential signals when receiving such a predetermined signal string of a packet.

Hence, the resistance changing circuit 82 for changing the termination resistance value to change the amplitudes of differential signals, and the amplitude detection circuit 84 for detecting amplitudes of differential signals are provided along the signal line D0. Thus, as described above, the amplitudes of differential signals can be changed when receiving a predetermined signal string of a packet. Therefore, according to this method, it is not necessary to provide any extra interrupt gate period between packets, and thus, no degradation in transmission efficiency occurs when an interrupt signal is transmitted.

In addition, the termination resistance value at the receiving apparatus is usually matched with an intrinsic impedance of a corresponding one of the signal line D0. This prevents signal reflections in a transmission path, thus maintaining signal quality and preventing the generation of unwanted radiation noise.

CITATION LIST

Patent Literature

PATENT DOCUMENT 1: Japanese Patent No. 2733242
PATENT DOCUMENT 2: PCT International Publication No. WO 2007/125670 A1

SUMMARY OF INVENTION

Technical Problem

However, according to the method of Patent Document 2, the termination resistance value at the receiving apparatus is changed in order to transmit an interrupt signal from the receiving apparatus to the transmitting apparatus. The change in termination resistance value breaks the match of an intrinsic impedance of the signal line D0 with the termination resistance value at the receiving apparatus. Therefore, signal reflections occur on the signal line D0, thus degrading signal quality, and in addition, reflected signals may generate unwanted radiation noise.

The present invention is made to solve the above-described problems, and an object of the present invention is to provide a signal transmission system capable of reducing degradation in transmission efficiency, and at the same time, preventing signal reflections on a transmission path, thus reducing degradation in signal quality.

Solution to Problem

According to a first aspect of the present invention, there is provided a data transmission system provided in each of a plurality of apparatuses communicating data with each other. The data transmission system includes: a pair of transmission lines connecting the plurality of apparatuses; a bridge termination resistor connected between the pair of transmission lines and having a resistance value that matches a differential impedance of the pair of transmission lines; a first switch that connects the bridge termination resistor to the pair of transmission lines when being turned on, and that disconnects the bridge termination resistor from the pair of transmission lines when being turned off; pull-up/down resistors connected between the transmission lines and a fixed voltage node, and having resistance values that respectively match characteristic impedances of the transmission lines, the fixed voltage node being either one of a power supply and a ground; and second switches that connect the pull-up/down resistors between the pair of transmission lines and the fixed voltage node when being turned on, and that disconnects the pull-up/down resistors from the pair of transmission lines when being turned off.

According to this data transmission system, the amplitudes and center voltage of differential signals change between when the bridge termination resistor is connected to the pair of transmission lines, and when the pull-up/down resistors (pull-up resistors or pull-down resistors) are connected to the pair of transmission lines. Such changes in the amplitudes and center voltage of the differential signals can be used as an interrupt signal.

Additionally, in this case, the bridge termination resistor connected to the pair of transmission lines has a resistance value that matches a differential impedance of the pair of transmission lines. The pull-up/down resistors have resistance values that respectively match the characteristic impedances of the transmission lines. Hence, even if the termination resistor is turned on/off, impedance matching between the transmission lines and the termination is maintained, and thus, it is possible to prevent the generation of unwanted radiation noise due to reflections of signals transmitted through the pair of transmission lines.

Additionally, in this case, the data transmission system may further include a mode changing unit that changes between a first mode in which the first switch is turned on and the second switches are turned off, and a second mode in which the first switch is turned off and the second switches are turned on. In addition, the data transmission system may further includes a detecting unit for detecting whether a remote apparatus involved in data communication is in the first mode or in the second mode, based on a change in states of a pair of differential signals transmitted through the pair of transmission lines.

In addition, the detecting unit may include an amplitude detecting unit for detecting a differential amplitude of the differential signals transmitted through the pair of transmission lines. In this case, the mode can be determined by detecting a change in differential amplitude. Furthermore, a capacitor may be inserted in series with the transmission line, or a capacitor may be inserted between the transmission line and either one of the power supply and the ground. This capacitor can prevent the generation of noise due to changes in center voltage (common voltage) when changing between the first and second modes.

In addition, the detecting unit may include a center voltage detecting unit for detecting a center voltage of the differential signals transmitted through the pair of transmission lines. In this case, the mode can be determined by detecting changes in the center voltage (common voltage) of the differential signals.

In addition, the mode changing unit may include: a first threshold value storage unit that stores a first threshold value for changing from the first mode to the second mode; and a second threshold value storage unit that stores a second threshold value for changing from the second mode to the first mode.

For example, one of the first and second modes may be a receive mode in which one apparatus provided with the data transmission system accepts reception of data from the other apparatus communicating data with the one apparatus, and the other of the first and second modes may be an interrupt mode in which the one apparatus stops reception of data. In this case, the mode changing unit may include: a first threshold value storage unit that stores a first threshold value for changing from the receive mode to the interrupt mode; and a second threshold value storage unit that stores a second threshold value for changing from the interrupt mode to the receive mode.

In the case that an information recording element temporarily storing transmitted data is further provided, the first and second threshold values may be set based on an amount of data stored in the information recording element or based on free space in the information recording element.

A value of the amount of data stored in the information storage element, for changing from the receive mode to the interrupt mode, may be set as the first threshold value. In this case, a value of the amount of data stored in the information storage element, being smaller than the first threshold value, can be set as the second threshold value.

Alternatively, a value of the free space in the information storage element, for changing from the receive mode to the interrupt mode, may be set as the first threshold value. In this case, a value of the free space in the information storage element, being greater than the first threshold value, can be set as the second threshold value.

In addition, the data transmission system may further include a transmission control unit that transmits data to one apparatus when the detecting unit has detected that the one apparatus is in the receive mode, and that stops data transmission to the one apparatus when the detecting unit has detected that the one apparatus is in the interrupt mode, the one apparatus communicating data with the other apparatus provided with the transmission system.

In addition, one of the first and second modes may be a basic mode, and the other of the first and second modes may be an interrupt mode, and the mode changing unit may temporarily change from the basic mode to the interrupt mode when one apparatus provided with the transmission system transmits an interrupt signal to the other apparatus communicating data with the one apparatus.

In addition, the bridge termination resistor and the first switch are composed of a transistor. In addition, the pull-up/down resistor and the second switch are composed of a transistor.

According to a second aspect of the present invention, there is provided an information processing apparatus for communicating data with other apparatus. The information processing apparatus includes: a connecting unit that connects the information processing apparatus to the other apparatus; a pair of transmission lines provided in the connecting unit; a bridge termination resistor connected between the pair of transmission lines and having a resistance value that matches a differential impedance of the pair of transmission lines; a first switch that connects the bridge termination resistor to the pair of transmission lines when being turned on, and that disconnects the bridge termination resistor from the pair of transmission lines when being turned off; pull-up/down resistors connected between the transmission lines and a fixed voltage node, and having resistance values that respectively match characteristic impedances of the transmission lines, the fixed voltage node being either one of a power supply and a ground; and second switches that connect the pull-up/down resistors between the pair of transmission lines and the fixed voltage node when being turned on, and that disconnects the pull-up/down resistors from the pair of transmission lines when being turned off.

According to a third aspect of the present invention, there is provided a data transmission method for transmitting a pair of differential signals of opposite phases through a pair of transmission lines connecting a plurality of apparatuses communicating data with each other. The data transmission method includes: a first mode where a bridge termination resistor is connected between the pair of transmission lines; and a second mode where pull-up/down resistors are connected between the transmission lines and either one of a power supply and a ground, the bridge termination resistor has a resistance value that matches a differential impedance of the pair of transmission lines, and the pull-up/down resistors have resistance values that match characteristic impedances of the transmission lines. The data transmission method includes appropriately changing between the first and second modes.

Advantageous Effects of Invention

According to the present invention, since the amplitudes and center voltage of differential signals can be changed, the change in the amplitudes or center voltage of the differential signals can be used as an interrupt signal. Therefore, it is not necessary to provide a transmit signal with interrupt gate periods, thus reducing degradation in transmission efficiency. In addition, since the resistance values of a bridge termination resistor and pull-up/down resistors are matched with the characteristic impedances of transmission lines, it is possible to prevent signal reflections on a transmission path, thus reducing degradation in signal quality.

DESCRIPTION OF EMBODIMENTS

Data transmission systems in embodiments of the present invention will be described below with reference to the accompanying drawings.

Overview

Data transmission systems of the embodiments described below include, as shown in FIGS. 2 and 3 or FIGS. 16 and 17, a pair of transmission lines 104 and 106, bridge termination resistors 114B and 116B, a first switch 120B, pull-up resistors or pull-down resistors (which are collectively referred to as "pull-up/clown resistors") 126B and 128B, and second switches 132B and 134B.

The data transmission systems 100 have a first mode and a second mode. In the first mode, the bridge termination resistors 114B and 116B are turned on and the pull-up resistors or the pull-down resistors 126B and 128B are turned off (see FIG. 2 and see FIG. 16), and in the second mode, the bridge termination resistors 114B and 116B are turned off and the pull-up resistors or the pull-down resistors 126B and 128B are turned on (see FIG. 3 and see FIG. 17)). The amplitudes and center voltage (electric potential) of differential signals are changed between the first and second modes. Such a change in the amplitudes or center voltage of differential signals can be used as an interrupt signal.

Here, the bridge termination resistors 114B and 116B are turned on between the pair of transmission lines 104 and 106. The bridge termination resistors 114B and 116B have resistance values that match a differential impedance of the pair of transmission lines 104 and 106. The pull-up resistors 126B and 128B are respectively connected between the transmission lines 104 and 106 and a power supply 121 (see FIG. 2). The pull-down resistors 126B and 128B are respectively connected between the transmission lines 104 and 106 and a ground 122 (see FIG. 16). The pull-up resistors or the pull-down resistors 126B and 128B have resistance values that respectively match the characteristic impedances of the transmission lines 104 and 106. Hence, according to this data transmission systems, the transmission efficiency can be improved, and in addition, no reflection of signals transmitted through the pair of transmission lines 104 and 106 occurs when an interrupt signal is transmitted, and thus, degradation in signal quality and unwanted radiation noise are less likely to occur. Details of the transmission systems will be described below.

First Embodiment

Figure 1:
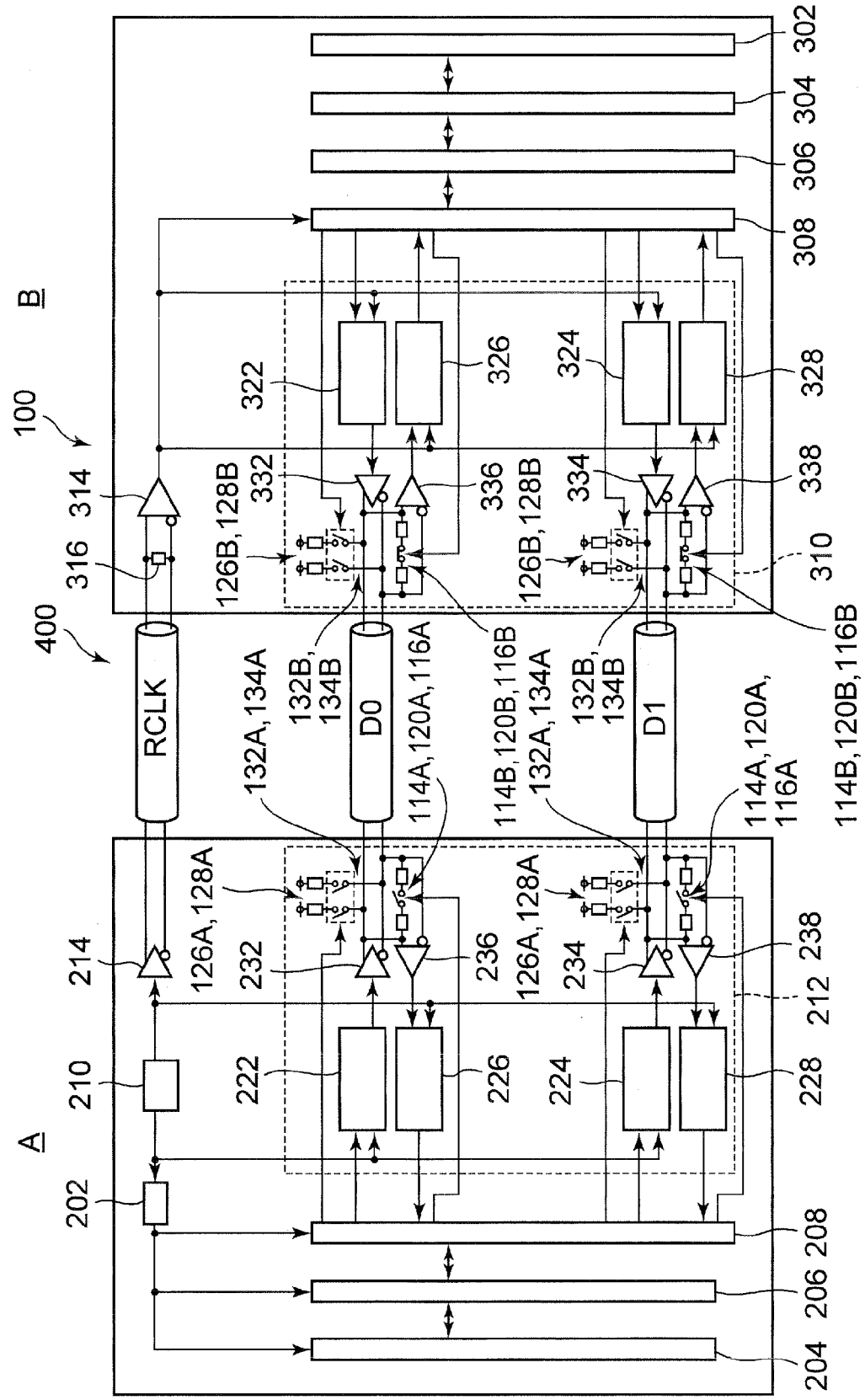
FIG. 1 is a diagram showing communication apparatuses having a data transmission system according to a first embodiment of the present invention.

A first embodiment of a data transmission system of the present invention will be described below. FIG. 1 is a diagram showing exemplary configurations of two apparatuses having a data transmission system of the present embodiment. Here, one apparatus A is a host terminal, e.g., a computer, and the other apparatus B is an information storage terminal, e.g., a removable memory card. The hardware configurations of the apparatuses A and B will be described below. The apparatuses A and B include corresponding components. Hence, for ease of understanding of the correspondence, the corresponding components between the apparatuses A and B are denoted by the same appropriate reference numerals, and the reference numerals for the components provided in the apparatus A is further appended with "A", and the reference numerals for the components provided in the apparatus B is further appended with B.

1. Configuration 1.1 Configuration of Apparatus A (Host Terminal)

In the present embodiment, the apparatus A is a host terminal, and includes, as shown in FIG. 1, a CPU 202, a RAM 204, a buffer 206, a card interface 208, a base clock 210, and a signal transmitting and receiving block 212. In addition, in the present embodiment, the apparatus A (host terminal) and the apparatus B (removable memory card) are connected to each other by signal lines RCLK, D0, and D1. The signal line RCLK acts as a clock signal line for transmitting clock signals. The signal lines D0 and D1 act as data signal lines for transmitting data, command signals, and response signals in both directions.

In the apparatus A (host terminal), the CPU 202 controls various devices in the apparatus A, such as the RAM 204, the buffer 206, the card interface 208, the base clock 210, and the signal transmitting and receiving block 212, in accordance with a certain program. In addition, the CPU 202 controls an apparatus connected to the apparatus A, such as the apparatus B (removable memory card), in accordance with a certain program.

The RAM 204 is an information storage element for storing various data (information). In the present embodiment, the RAM 204 can store, for example, various data transmitted to and received from the apparatus B (removable memory card).

The buffer 206 is an information storage element, and is a device for temporarily storing information when writing data into the RAM 204 or reading data from the RAM 204. The card interface 208 is an interface for connecting the apparatus B (removable memory card) to the apparatus A (host terminal). In the present embodiment, data is passed through the buffer 206 and the card interface 208, when reading data from the RAM 204 to the apparatus B (removable memory card), or when writing data from the apparatus B (removable memory card) to the RAM 204.

The base clock 210 generates a clock signal for a timing reference by which the CPU 202 controls the apparatus A. The base clock 210 is connected to devices in the apparatus A (host terminal), e.g., to the card interface 208 and to devices in the signal transmitting and receiving block 212, and supplies the clock signal to these devices. In addition, the base clock 210 is connected to the apparatus B (removable memory card) through a driver 214 and the signal line RCLK (clock signal line).

The signal transmitting and receiving block 212 is responsible for input and output of commands, responses, and data, etc. As described above, each of the apparatus A (host terminal) and the apparatus B (removable memory card) has the signal lines D0 and D1 (data signal lines). The signal transmitting and receiving block 212 includes serializers 222 and 224, deserializers 226 and 228, drivers 232 and 234, and receivers 236 and 238.

The serializers 222 and 224 are connected to the signal lines D0 and D1 through the drivers 232 and 234, respectively. The deserializers 226 and 228 are connected to the signal lines D0 and D1 through the receivers 236 and 238, respectively. Each of the serializers 222 and 224 and the deserializers 226 and 228 is supplied with the clock signal from the base clock 210.

The serializers 222 and 224 are circuits for converting (low speed) parallel signals to (high speed) serial signals. The serializers 222 and 224 performs parallel-to-serial conversion of signals, such as data supplied from the card interface 208 under control of the CPU 202, and commands (control signals) from the CPU 202. At this time, the serializers 222 and 224 transmit the data and the commands (control signals) to the apparatus B (removable memory card) in a timely manner with reference to the clock signal supplied from the base clock 210.

The deserializers 226 and 228 are circuits for converting (high speed) serial signals to (low speed) parallel signals. The deserializers 226 and 228 performs serial-to-parallel conversion of signals transmitted from the apparatus B (removable memory card) with reference to the clock signal supplied from the base clock 210.

The parallel signals converted by the deserializers 226 and 228 are processed under control of the CPU 202. The parallel signals are stored in, for example, the RAM 204 through the card interface 208 and the buffer 206. In addition, responses (response signals) converted to parallel signals by the deserializers 226 and 228 are transmitted to the CPU 202 through the card interface 208, and are subjected to required processes.

1.2 Configuration of Apparatus B (Removable Memory Card)

Next, the configuration of the apparatus B will be described. The apparatus B is an information storage terminal such as a removable memory card, and includes, as shown in FIG. 1, a flash memory 302, a flash memory interface 304, a buffer 306, a host interface 308, and a signal transmitting and receiving block 310.

The apparatus B (removable memory card) includes a receiver 314 connected to the signal line RCLK. The receiver 314 is connected to devices in the apparatus B (removable memory card), such as the host interface 308 and the signal transmitting and receiving block 310.

The clock signal generated by the base clock 210 in the apparatus A (host terminal) is supplied to the apparatus B (removable memory card) through the driver 214 in the apparatus A (host terminal), the signal line RCLK (clock signal line), and the receiver 314 in the apparatus B (removable memory card). The clock signal is used as a timing reference for controlling devices in the apparatus B (removable memory card), such as the host interface 308 and the signal transmitting and receiving block 310.

A termination resistor 316 is connected to the signal line RCLK (clock signal line). The termination resistor 316 prevents the reflection of a clock signal transmitted through the signal line RCLK (clock signal line).

The flash memory 302 is an information storage element for storing various data (information). In the present embodiment, the flash memory 302 can store, for example, various data transmitted and received between the apparatuses A and B. The flash memory interface 304 is an interface for connecting the flash memory 302 to the buffer 306.

The buffer 306 is an information storage element, and is a device for temporarily storing information when writing data into the flash memory 302 and reading data from the flash memory 302. The host interface 308 is an interface for connection to the apparatus A (host terminal). In the present embodiment, data is passed through the buffer 306 and the host interface 308 when reading data from the flash memory 302 to the apparatus A (host terminal), or when writing data from the apparatus A (host terminal) to the flash memory 302. These reading and writing of data are performed based on commands (control signals) from the CPU 202 in the apparatus A.

The signal transmitting and receiving block 310 is responsible for input and output of commands, responses, and data, etc. In the present embodiment, each of the apparatus A (host terminal) and the apparatus B (removable memory card) has the signal lines D0 and D1. The signal transmitting and receiving block 310 includes serializers 322 and 324, deserializers 326 and 328, drivers 332 and 334, and receivers 336 and 338.

The serializers 322 and 324 are connected to the signal lines D0 and D1 through the drivers 332 and 334, respectively. The deserializers 326 and 328 are connected to the signal lines D0 and D1 through the receivers 336 and 338. In addition, each of the serializers 322 and 324 and the deserializers 326 and 328 is connected to the receiver 314 associated with the signal line RCLK (clock signal line), and is supplied with the clock signal from the base clock 210 in the apparatus A (host terminal).

The serializers 322 and 324 performs parallel-to-serial conversion of signals, such as data supplied from the host interface 308 under control of the CPU 202 in the apparatus A (host terminal), and responses (response signals) to commands (control signals) from the CPU 202, so as to convert from (low speed) parallel signals to (high speed) serial signals. At this time, the serializers 322 and 324 transmit the data and the responses (response signals) to the apparatus A (host terminal) in a timely manner with reference to the clock signal supplied from the base clock 210.

The deserializers 326 and 328 performs serial-to-parallel conversion of signals, such as data and commands (control signals) transmitted from the apparatus A (host terminal), with reference to the clock signal supplied from the base clock 210.

The data converted to parallel signals by the deserializers 326 and 328 is processed under control of the CPU 202 (based on commands (control signals) received from the apparatus A (host terminal)). The data is stored in, for example, the flash memory 302 through the host interface 308, the buffer 306, and the flash memory interface 304. The commands (control signals) received by the deserializers 326 and 328 are transmitted to the host interface 308, and are subjected to required processes through the host interface 308. A data transmission system 100 will be described below.

1.3 Data Transmission System

Figure 2:
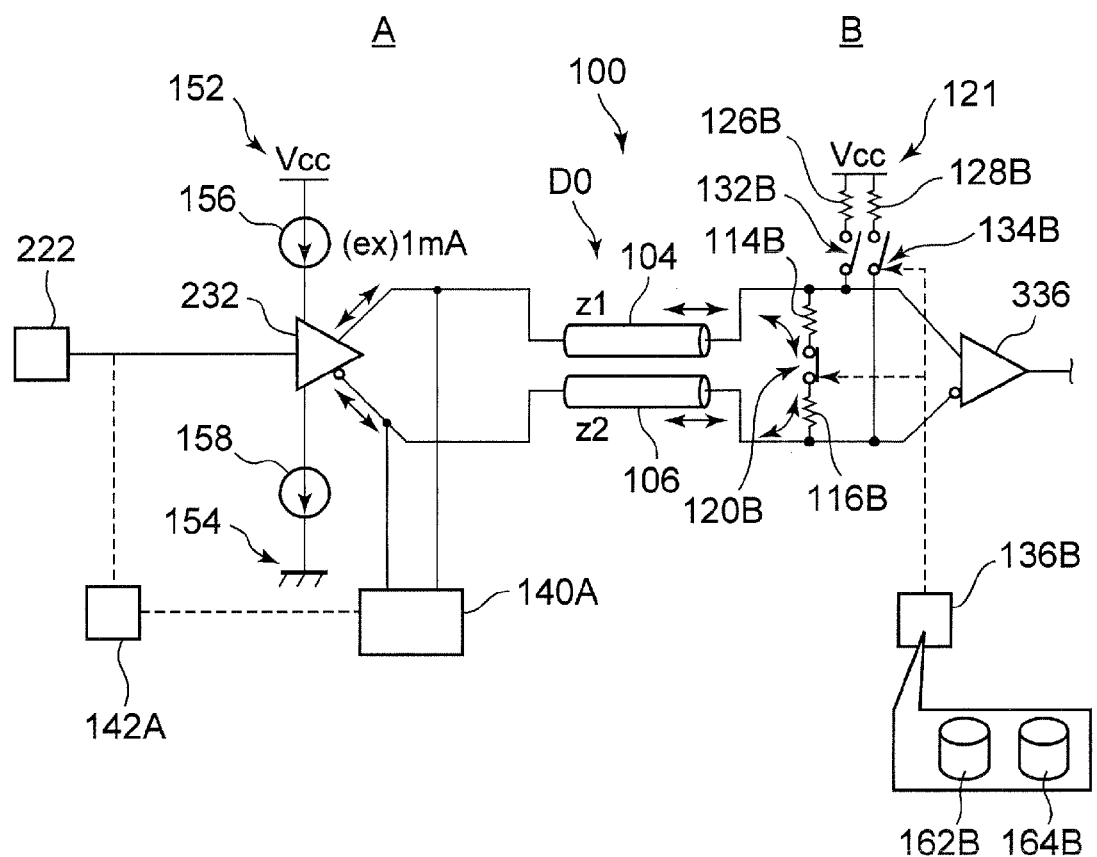
FIG. 2 is a diagram schematically showing the data transmission system according to the first embodiment of the present invention (first mode).

As shown in FIGS. 1 and 2, the data transmission system 100 of the present embodiment is provided for the apparatus A (host terminal) and the apparatus B (removable memory card) communicating data with each other.

FIG. 2 is a diagram schematically showing the data transmission system 100 installed on the apparatuses A and B. In the present embodiment, the apparatuses A and B mutually communicate (transmit and receive) data and appropriately operate as the transmitting apparatus or the receiving apparatus. Note that FIG. 2 shows the most relevant components for generating an interrupt signal on the signal line D0 (data signal line) at the receiving apparatus, when one apparatus A operates as the transmitting apparatus and the other apparatus B operates as the receiving apparatus. The signal line D1 has roughly the same configuration as that of the signal line D0.

In the present embodiment, as described above, those components corresponding to the components provided in the apparatus A are also provided in the apparatus B, and those components corresponding to the components provided in the apparatus B are also provided in the apparatus A. Hence, according to the data transmission system 100, an interrupt signal can be appropriately generated at the receiving apparatus, also in the case that one apparatus A operates as the receiving apparatus and the other apparatus B operates as the transmitting apparatus.

As shown in FIG. 2, the signal line D0 (data signal line) includes a pair of transmission lines 104 and 106. The pair of transmission lines 104 and 106 connect the apparatuses A and B. In an example shown in FIG. 2, the pair of transmission lines 104 and 106 are connected to the driver 232 in the apparatus A (host terminal) and to the receiver 336 in the apparatus B (removable memory card). The driver 232 in the apparatus A (host terminal) is connected to a current source (hereinafter, referred to as the "higher-voltage current source") 156 connected to a power supply 152, a current source (hereinafter, referred to as the "lower-voltage current source") 158 connected to a ground 154 (reference electric potential), and the serializer 222 of the apparatus A (host terminal). The serializer 222 generates a signal bit string that is a serial signal converted from a parallel signal received from the card interface 208. The driver 232 outputs differential signals generated based on the signal bit string generated by the serializer 222, to the pair of transmission lines 104 and 106.

Here, the driver 232 connects one of the pair of transmission lines 104 and 106 to the higher-voltage current source 156, and connects the other to the lower-voltage current source 158. In addition, the driver 232 alternately changes the connections of the pair of transmission lines 104 and 106 to the higher-voltage current source 156 and the lower-voltage current source 158, at short intervals. Thus, differential signals "a" and "b" including signals of opposite phases are generated on the pair of transmission lines 104 and 106. A signal wave to be transmitted is generated by, for example, the serializer 222 in the apparatus A (host terminal). Note that the circuit configuration for generating differential signals is not limited to that described above, and various circuits can be applied. The receiver 336 in the apparatus B (removable memory card) has the reception characteristics capable of correctly receiving signals even if the differential amplitude changes.

Note that, though not shown, the pair of transmission lines 104 and 106 are also connected to the receiver 236 (see FIG. 1) in the apparatus A (host terminal) and the driver 332 (see FIG. 1) in the apparatus B (removable memory card). When the apparatus A (host terminal) operates as the receiving apparatus and the apparatus B (removable memory card) operates as the transmitting apparatus, differential signals are generated on the pair of transmission lines 104 and 106 under control of the apparatus B (removable memory card).

As shown in FIG. 2, the pair of transmission lines 104 and 106 are connected by bridge termination resistors 114B and 116B and a first switch 120B, the first switch 120B being positioned between the bridge termination resistors 114B and 116B. In addition, pull-up resistors 126B and 128B are connected to the pair of transmission lines 104 and 106 through second switches 132B and 134B, respectively.

The bridge termination resistors 114B and 116B are connected between the pair of transmission lines 104 and 106. In the present embodiment, the total resistance value of the bridge termination resistors 114B and 116B is equal to a resistance value that matches a differential impedance of the pair of transmission lines 104 and 106. In the example shown in FIG. 2, a plurality of (in FIG. 2, two) resistors are connected in series with a bridge wiring line connected between the transmission lines 104 and 106. However, the configuration of the bridge termination resistors 114B and 116B is not limited thereto; for example, the bridge termination resistors 114B and 116B may be composed of a single resistor having a resistance value that matches a differential impedance of the transmission lines 104 and 106.

The first switch 120B is a switch for changing between connection and disconnection of the bridge termination resistors 114B and 116B. Preferably, the first switch 120B can be controlled electrically. For example, the first switch 120B can be composed of a transistor (e.g., a thin film transistor). In this case, it is suitable that the transistor is configured to change two mode by controlling a gate voltage, one mode is such that a current flows between a source and a drain, and the other mode is such that a current is stopped between the source and the drain. Furthermore, the bridge termination resistors 114B and 116B and the first switch 120B can be composed of a transistor. In this case, the transistors preferably have a resistance value that matches a differential impedance of the transmission lines 104 and 106 in a mode where a current flows between a source and a drain.

In the present embodiment, the pull-up resistors 126B and 128B are respectively connected between the transmission lines 104 and 106 and a power supply 121. The pull-up resistors 126B and 12813 have resistance values that respectively match the characteristic impedances z1 and z2 of the transmission lines 104 and 106. In addition, in the present embodiment, the power supply 121 is electrically connected to the power supply 152 of the apparatus A (host terminal), and has the same voltage Vcc as that of the power supply 152 of the apparatus A (host terminal).

The second switches 132B and 134B are switches for changing between connection and disconnection of the pull-up resistors 126B and 128B. Preferably, the second switches 132B and 134B can be controlled electrically. For example, the second switches 132B and 13413 can be composed of transistors (e.g., thin film transistors). In this case, it is suitable that the transistors is configured to change two mode by controlling a gate voltage, one mode is such that a current flows between a source and a drain, and the other mode is such that a current is stopped between the source and the drain. Furthermore, the pull-up resistor 126B and the second switch 13213 can be a transistor, and the pull-up resistor 128B and the second switch 134B can be composed of a transistor. In this case, it is preferable that the transistors have resistance values that respectively match the characteristic impedances z1 and z2 of the transmission lines 104 and 106 in a mode where a current flows between a source and a drain.

1.4 Mode Changing Unit

In the present embodiment, there are provided a "first mode" where the first switch 120B is turned on and the second switches 132B and 134B are turned off, and a "second mode" where the first switch 120B is turned off and the second switches 132B and 134B are turned on. In addition, according to the present embodiment, there is provided a mode changing unit 136B for changing between the first and second modes. The mode changing unit 136B changes between the first and second modes in accordance with a preset program. FIG. 2 shows the most relevant components for generating an interrupt signal on the signal line D0 (data signal line), when the apparatus A is the transmitting apparatus and the apparatus B is the receiving apparatus. In this case, the mode changing unit 136B is provided in the receiving apparatus B, and appropriately changes the receiving apparatus B to either the first mode or the second mode.

2. Operation 2-1. Operation of Data Transmission System

The operation of the transmission system of the present embodiment will be described below. According to the data transmission system 100 of the present embodiment, the amplitudes and center voltage of differential signals change between the first and second modes. Even when the mode is changed, reflections of signals transmitted through the transmission lines 104 and 106 are prevented.

Figure 3:
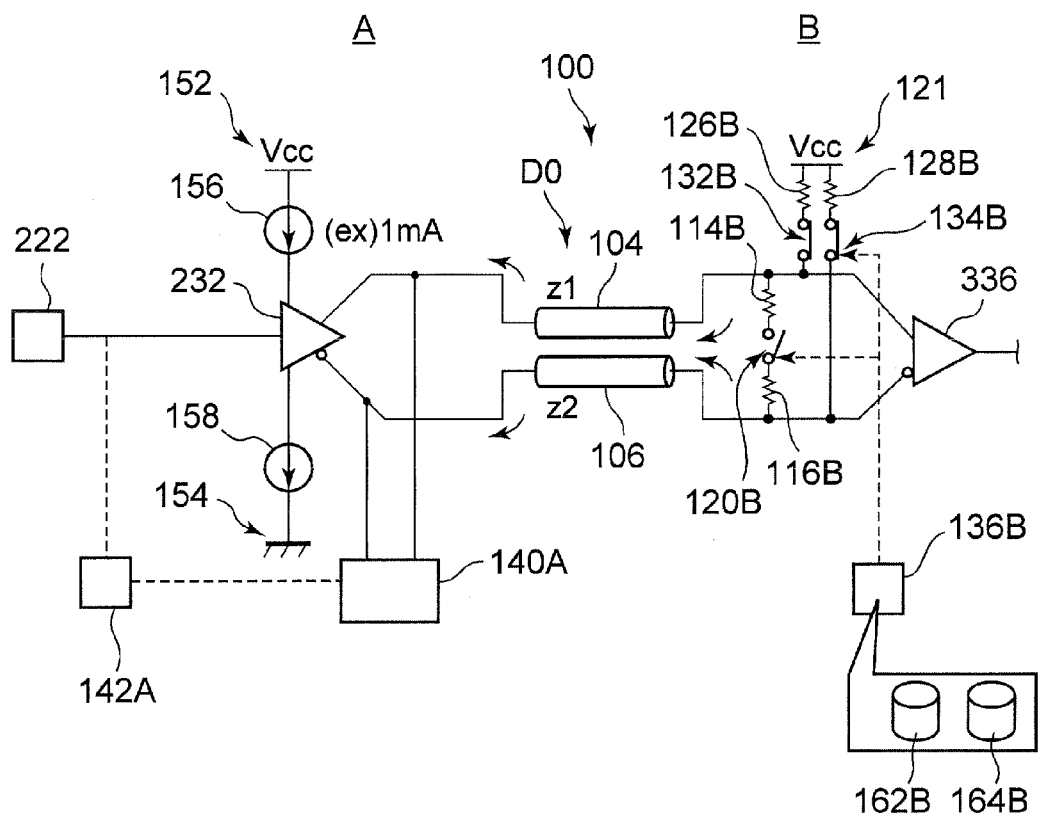
FIG. 3 is a diagram schematically showing the data transmission system according to the first embodiment of the present invention (second mode).

FIG. 2 shows connections for the case of the first mode where the first switch 120B is turned on (i.e., the bridge termination resistors 114B and 116B are turned on) and the second switches 132B and 134B are turned off (i.e., the pull-up resistors 126B and 128B are turned off). FIG. 3 shows connections for the case of the second mode where the first switch 120B is turned off (i.e., the bridge termination resistors 114B and 116B are turned off) and the second switches 132B and 134B are turned on (i.e., the pull-up resistors 126B and 128B are turned on).

Figure 4:
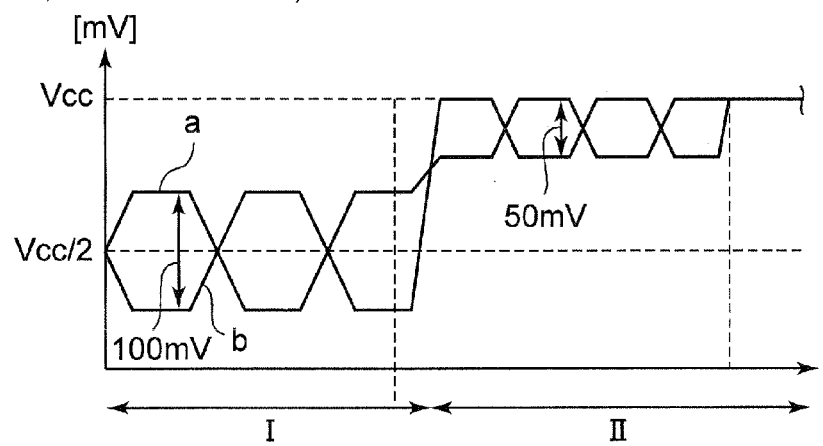
FIG. 4 is a diagram showing changes in the single-ended amplitudes of differential signals in the data transmission system according to the first embodiment of the present invention.
Figure 5:
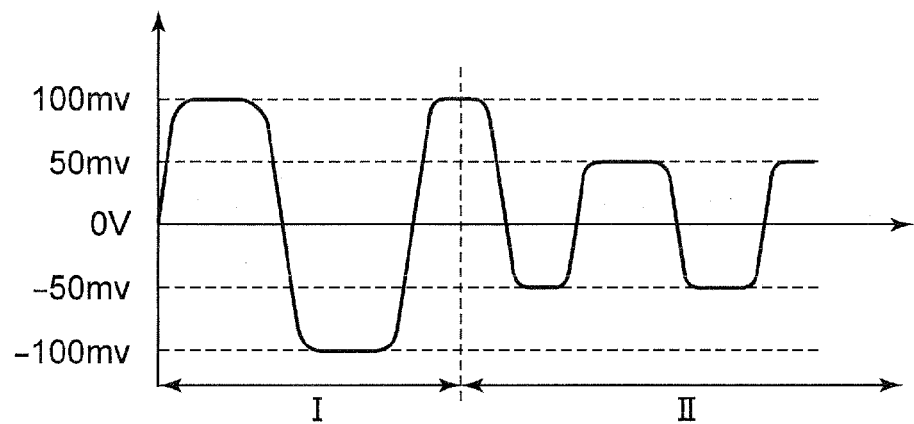
FIG. 5 is a diagram showing changes in differential amplitude in the data transmission system according to the first embodiment of the present invention.
Figure 6:
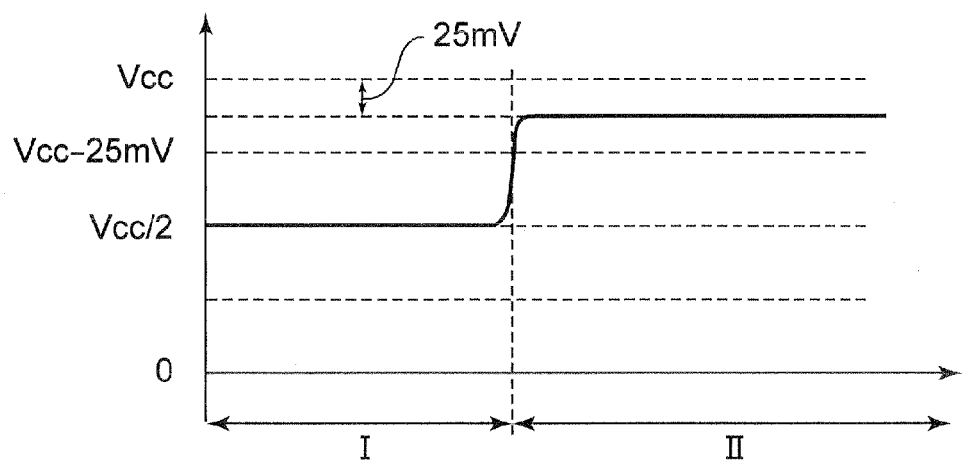
FIG. 6 is a diagram showing a change in center voltage (common voltage) in the data transmission system according to the first embodiment of the present invention.

FIGS. 4 to 6 are diagrams showing changes in differential signals "a" and "b" appearing on the pair of transmission lines 104 and 106. Referring to FIGS. 4 to 6, the interval indicated with "I" corresponds to the control of the first mode (the mode of FIG. 2), and the interval indicated with "II" corresponds to the control of the second mode (the mode of FIG. 3).

FIG. 4 shows changes in the single-ended amplitudes of differential signals "a" and "b" transmitted through the transmission lines 104 and 106. FIG. 5 shows changes in the differential amplitude (a−b) of the differential signals "a" and "b" transmitted through the transmission lines 104 and 106. FIG. 6 shows a change in the center voltage (common voltage) of the differential signals "a" and "b" transmitted through the transmission lines 104 and 106.

2.2 First Mode

At first, the first mode will be described. In the first mode, the bridge termination resistors 114B and 116B are turned on, and the pull-up resistors 126B and 128B are turned off, as shown in FIG. 2. In the first mode, when differential signals "a" and "b" are transmitted through the transmission lines 104 and 106, a current flows through the bridge termination resistors 114B and 116B, but no current flows through the pull-up resistors 126B and 128B. In addition, according to the present embodiment, the driver 232 controls the current flows in the transmission lines 104 and 106 through which the differential signals "a" and "b" are transmitted, so that one of the differential signals "a" and "b" is connected to the higher-voltage current source 156 (power supply voltage: Vcc), and the other of the differential signals "a" and "b" is connected to the ground (GND) through the lower-voltage current source 158.

The bridge termination resistors 114R and 116R have resistance values that match the differential impedance of the pair of transmission lines 104 and 106. Hence, in the first mode where the bridge termination resistors 114B and 116B are turned on and the pull-up resistors 126B and 128B are turned off as shown in FIG. 2, reflections of the signals "a" and "b" transmitted through the pair of transmission lines 104 and 106 are prevented.

In addition, the signals "a" and "b" transmitted through the pair of transmission lines 104 and 106 flow from the power supply 152 (Vcc: power supply voltage) through the pair of transmission lines 104 and 106 and the bridge termination resistors 114B and 116B into the ground (0: reference electric potential). Hence, the differential amplitude between the differential signals "a" and "b" transmitted through the pair of transmission lines 104 and 106 has a value corresponding to the differential impedance of the transmission lines 104 and 106 and the resistance values of the bridge termination resistors 114B and 116B.

For example, suppose a case in which each characteristic impedance of the transmission lines 104 and 106 is 50Ω and a current of 1 mA flows through each of the transmission lines 104 and 106. In this case, the combined differential impedance of the pair of transmission lines 104 and 106 is 100Ω. The combined resistance value of the bridge termination resistors 114B and 116B should be a value that matches the differential impedance. Hence, the combined resistance of the bridge termination resistors 114B and 116B is 100Ω. The resistance values of the bridge termination resistors 114B and 116B are, for example, 50Ω, respectively.

In this case, in the first mode, the bridge termination resistors 114B and 116B are turned on, and the pull-up resistors 126B and 128B are turned off, as shown in FIG. 2. In this case, the single-ended amplitudes of both the differential signals "a" and "b" transmitted through the pair of transmission lines 104 and 106 are 50 mV (=50Ω×1 mA) with respect to a center voltage (Vcc/2), as shown in FIG. 4 with "I". Since the differential signals "a" and "b" have opposite, positive and negative phases, the differential amplitude of the differential signals (a−b) is 100 mV, as shown in FIG. 5 with "I". The center voltage (common voltage) is Vcc/2, as shown in FIG. 6 with "I".

2.3 Second Mode

Next, the second mode will be described. In the second mode, the bridge termination resistors 114B and 116B are turned off, and the pull-up resistors 126B and 128B are turned on, as shown in FIG. 3. In the second mode, when differential signals "a" and "b" are transmitted through the transmission lines 104 and 106, no current flows through the bridge termination resistors 114B and 116B, but currents flow through the pull-up resistors 126B and 128B.

According to the present embodiment, in the transmitting apparatus A, one of the transmission lines 104 and 106 through which differential signals are transmitted is connected to the power supply 152 (Vcc), and the other of the transmission lines 104 and 106 is connected to the ground 154. In addition, two modes continuously alternate with each other at a predetermined frequency; in one mode, the transmission line 104 is connected to the power supply 152 (Vcc) and the transmission line 106 is connected to the ground 154, and in the other mode, vice versa.

In the receiving apparatus B, the pull-up resistors 126B and 128B are respectively connected between the transmission lines 104 and 106 and the power supply 121 (Vcc). Thus, when in the transmitting apparatus A the transmission line 104 or 106 is connected to the power supply 152 (Vcc), the voltages at both ends of the transmission line 104 or 106 become equal to Vcc. Hence, no current flows through the transmission line 104 or 106 connected to the power supply 152 (Vcc).

On the other hand, when in the transmitting apparatus A the transmission line 104 or 106 is connected to the ground 154, a current flows from the power supply 121 (Vcc) of the receiving apparatus B through the pull-up resistor 126B or 128B and through that transmission line 104 or 106 into the ground 154. Thus, when the bridge termination resistors 114B and 116B are turned off and the pull-up resistors 126B and 128B are turned on, a current flows through one of the transmission lines 104 and 106. Since a voltage on the other one of the transmission lines 104 and 106 is Vcc, no current flows therethrough. The transmission line through which a current flows is alternately changed between the transmission lines 104 and 106 according to the signal cycle.

In this case, the resistance values of the pull-up resistors 126B and 128B respectively match the characteristic impedances of the transmission lines 104 and 106. Hence, reflections of the signals "a" and "b" transmitted through the transmission lines 104 and 106 are prevented.

As shown in FIG. 4, the signal voltage on one of the pair of transmission lines 104 and 106 that is connected to the power supply 152 (Vcc) in the transmitting apparatus A is equal to the power supply voltage (Vcc). On the other hand, on the other transmission line connected to the ground 154 in the transmitting apparatus A, a current flows from the power supply 121 (Vcc) of the receiving apparatus B into the ground (reference electric potential: 0) through one of the pull-up resistors 126B and 128B connected to that transmission line and through that transmission line. Hence, the voltages of the signals "a" and "b" transmitted through the pair of transmission lines 104 and 106 have an amplitude corresponding to the characteristic impedance of one of the transmission lines 104 and 106 and a pull-up resistor connected to that transmission line.

Here, suppose a case in which each characteristic impedance of the transmission lines 104 and 106 is 50Ω, and a current of 1 mA flows through each of the transmission lines 104 and 106. Preferably, the resistance values of the pair of pull-up resistors 126B and 128B match the characteristic impedances of the transmission lines 104 and 106 connected to the pull-up resistors 126B and 128B, respectively. That is, since each characteristic impedance of the transmission lines 104 and 106 is 50Ω, each resistance value of the pull-up resistors 126B and 128B is also 50Ω.

In the second mode, the bridge termination resistors 114B and 116B are turned off, and the pull-up resistors 126B and 128B are turned on, as shown in FIG. 3. In this case, one of the voltages of the differential signals "a" and "b" transmitted through the pair of transmission lines 104 and 106 is equal to the power supply voltage (Vcc), and the other is equal to (Vcc−50) mV, as shown in FIG. 4 with "II". Hence, the differential amplitude (a−b) is 50 mV, as shown in FIG. 5 with "II". The center voltage (common voltage) is (Vcc−25) mV, as shown in FIG. 6 with "II".

As described above, according to the present embodiment, the respective termination resistances of the transmission lines 104 and 106 match the differential impedance in both the first mode (the configuration of FIG. 2) and the second mode (the configuration of FIG. 3). Hence, in both the first and second modes, it is possible to prevent reflections of signals transmitted through the pair of transmission lines 104 and 106, thus suppressing unwanted radiation noise due to signal reflections.

2.4 Interrupt Signal

According to the data transmission system 100 of the present embodiment, the amplitudes (i.e., differential amplitude) and center voltage of the differential signals "a" and "b" change between the first and second modes, as shown in FIGS. 4 to 6. According to the above-described example, in the first mode, the amplitudes (i.e., differential amplitude) of the differential signals "a" and "b" are 100 mV, and the center voltage (common voltage) is Vcc/2. In the second mode, the amplitudes of the differential signals "a" and "b" are 50 mV, and the center voltage (common voltage) is (Vcc−25) mV.

In the present embodiment, such a change in the amplitudes or center voltage of the differential signals "a" and "b" is used as an interrupt signal. Note that in the present embodiment the receiver 336 in the apparatus B has the reception characteristics capable of correctly receiving signals even if the differential amplitude changes between the first and second modes. Data can be transmitted in both the first and second modes. Hence, it is possible to use one of the first and second modes as a mode for data transmission, and the other as a mode for an interrupt signal.

2.5 Detecting Unit

The data transmission system 100 includes a detecting unit 140A for detecting whether the receiving apparatus B is in the first mode or in the second mode, based on changes in the pair of differential signals "a" and "b" transmitted through the pair of transmission lines 104 and 106 (see FIGS. 4 to 6).

In the present embodiment, the receiving apparatus B includes the mode changing unit 136B for changing between the first and second modes (see FIG. 2). The transmitting apparatus A communicating data with the apparatus B includes the detecting unit 140A for detecting whether the apparatus B is in the first mode or in the second mode.

According to the present embodiment, a change in the amplitudes or center voltage of the differential signals "a" and "b" is used as an interrupt signal. Hence, the detecting unit 140A can be composed of, for example, a circuit for detecting amplitudes of the differential signals "a" and "b" transmitted through the pair of transmission lines 104 and 106. Alternatively, the detecting unit 140A may be composed of a circuit (center voltage detection circuit) for detecting a center voltage (common voltage) of the differential signals "a" and "b" transmitted through the pair of transmission lines 104 and 106.

Such a center voltage detection circuit can be composed of a bias detection circuit. In this case, the bias detection circuit receives, as inputs, reference electric potentials of a transmission path for differential signals (in the above-described example, the power supply voltage (Vcc) and the ground electric potential (0)), and a center voltage of the differential signals. Based on the inputted voltages, the bias detection circuit detects a difference between the reference electric potential and the center voltage. Thus, the center voltage detection circuit can detect a change in the center voltage of the differential signals "a" and "b".

2.6 Transmission of Interrupt Signal

As described above, a change in the amplitudes or center voltage of differential signals is used as an interrupt signal. Such an interrupt signal can be recognized by detecting a change in the amplitudes or center voltage of the differential signals. That is, the data transmission system 100 can transmit an interrupt signal from the receiving apparatus to the transmitting apparatus without providing any extra interrupt gate period between packets.

Figure 7:
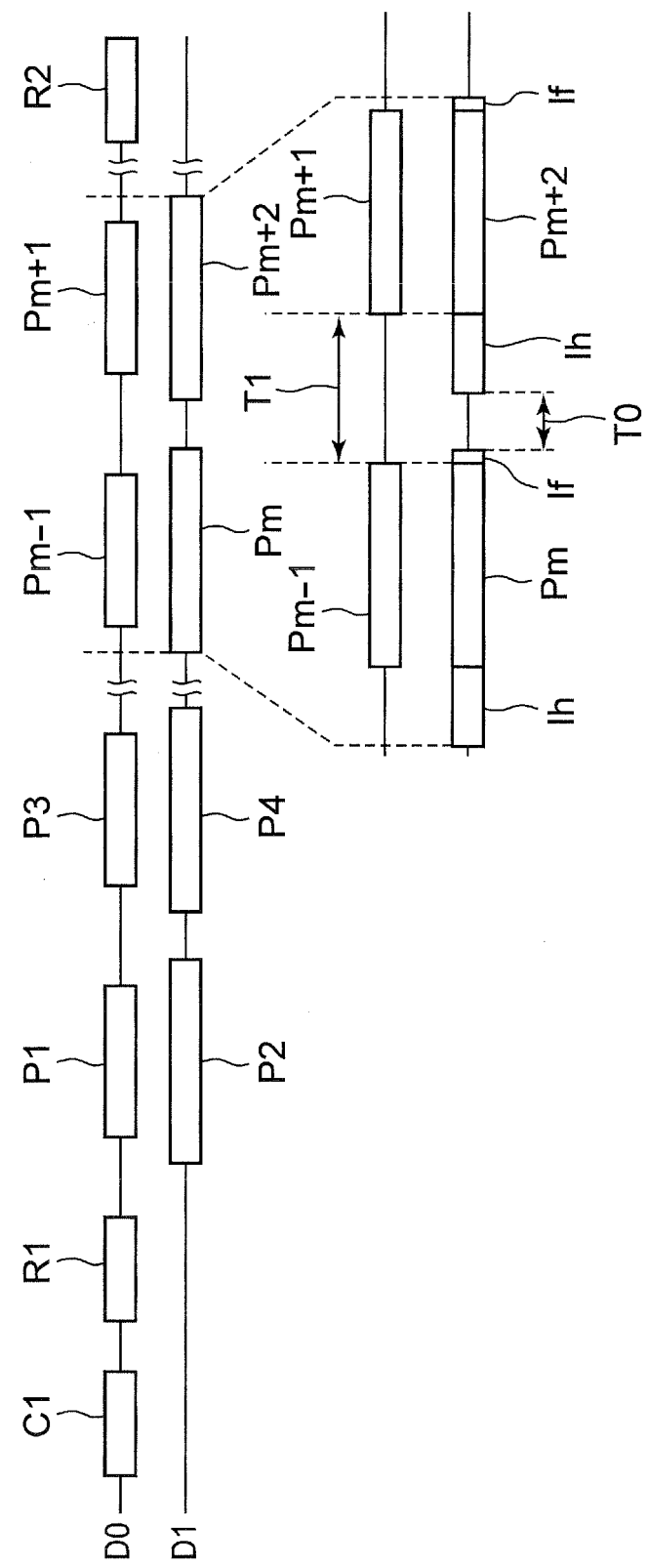
FIG. 7 is a diagram showing data transmitted using a differential scheme in the data transmission system according to the first embodiment of the present invention.

FIG. 7 is a diagram illustrating the flow of data transmitted through the signal lines D0 and D1 when the data is transmitted from the apparatus A (host terminal) to the apparatus B (removable memory card). In an example shown in FIG. 7, both the signal lines D0 and D1 are used for data transmission from the apparatus A to the apparatus B. In this example, when the apparatus A transmits a write command C1, then the apparatus B (removable memory card) transmits a response R1 in response to the write command C1, as shown in FIG. 7. Thereafter, data is transmitted from the apparatus A (host terminal) to the apparatus B (removable memory card). In this case, the data is transmitted as a plurality of divided packets P1, P2 ... Pm−1, Pm, Pm+1 ... each having predetermined bit lengths. When the data transmission is completed, a response R2 is transmitted from the apparatus B to the apparatus A.

In addition, in the present embodiment, predetermined header information "Ih" and footer information "If" are respectively added before and after each of the packets Pm, Pm+2 ... transmitted through one of the two signal lines D0 and D1, e.g., through the signal line D1, as shown in FIG. 7. Basic time slots T0 are provided between those packets. Furthermore, between the packets are provided extended time slots T1, each including one basic time slot T0, and additional portions of the predetermined header information "Ih" and footer information "If". The data transmission system 100 can appropriately change between the first and second modes during each extended time slot T1. According to this configuration, an interrupt signal can be transmitted from the receiving apparatus B to the transmitting apparatus A, without providing any extra interrupt gate period between packets. Note that the apparatus A that transmits data may output a high or low differential signal during each basic time slot T0.

2.7 Flow of Transmitting Interrupt Signal

Figure 8:
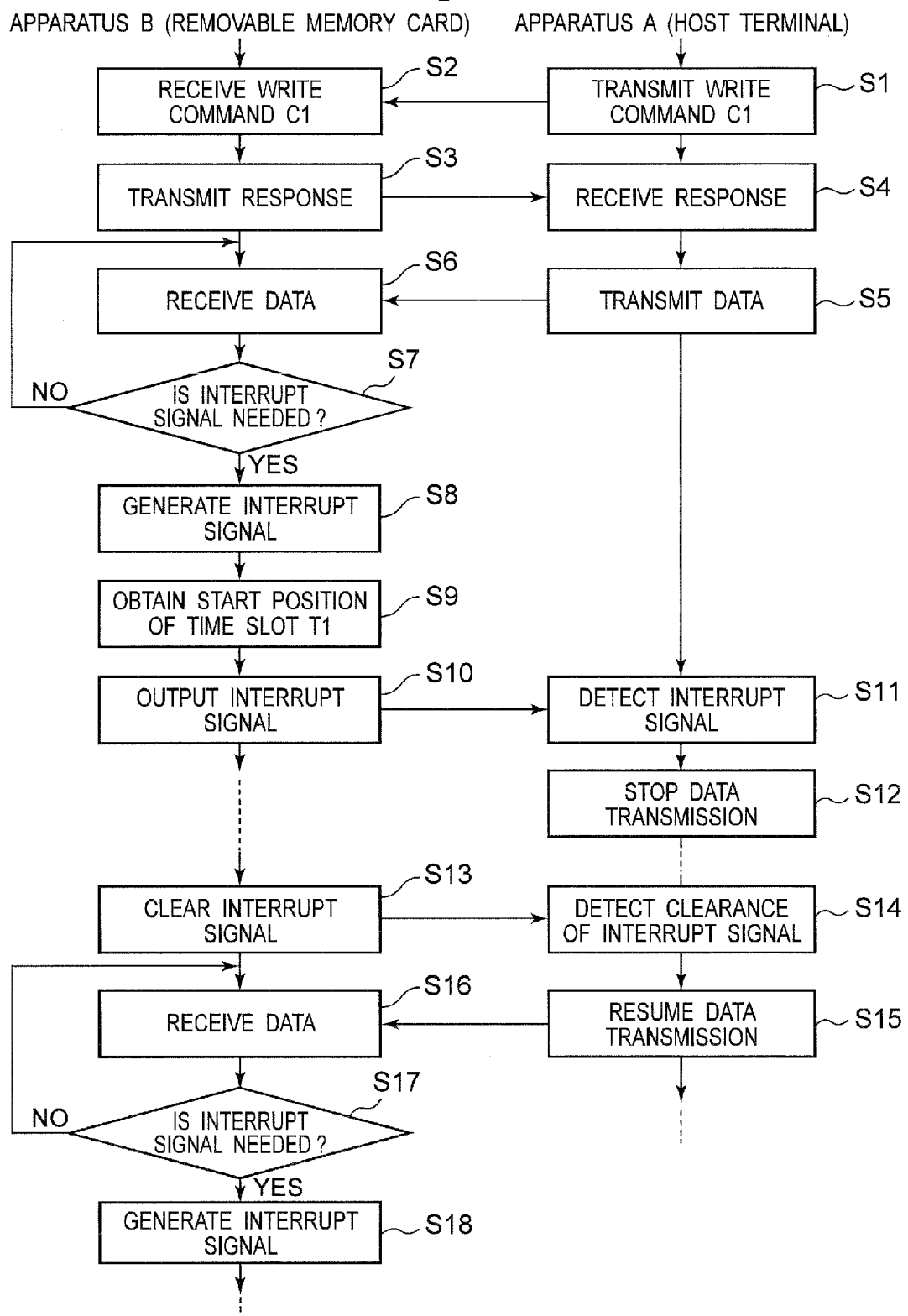
FIG. 8 is a diagram showing the flow of transmitting data in the data transmission system according to the first embodiment of the present invention.

FIG. 8 is a flowchart illustrating an exemplary control of transmission of an interrupt signal from the receiving apparatus B (removable memory card) to the transmitting apparatus A (host terminal) during an extended time slot T1.

As shown in FIG. 8, the apparatus A transmits a write command C1 (see FIG. 7) to the apparatus B (S1). The apparatus B receives the write command C1 (S2) and transmits a response R1 (S3). The apparatus A receives the response R1 (S4). Thereafter, the apparatus A transmits data (S5). The apparatus B receives the data transmitted from the apparatus A (S6). The data received by the apparatus B is written into the flash memory 302 through the host interface 308, the buffer 306, and the flash memory interface 304.

At this time, the host interface 308 appropriately generates a signal for stopping the apparatus A from transmitting data. For example, in the present embodiment, the host interface 308 temporarily stores the received data in the buffer 306 and writes the data into the flash memory 302 through the flash memory interface 304. In this case, there may be a case in which the speed at which data is written from the host interface 308 through the buffer 306 and the flash memory interface 304 into the flash memory 302 is slower than the speed at which data is transmitted from the apparatus A.

In such a case, the data transmitted from the apparatus A is accumulated in the buffer 306. If a predetermined amount of data or more is accumulated in the buffer 306, the buffer 306 cannot store any more data. Hence, the host interface 308 determines in accordance with a certain program that it is necessary to stop data transmission from the apparatus A to the apparatus B. In this case, the apparatus B transmits an interrupt signal to the apparatus A to prevent data from being accumulated in the buffer 306 in excess of the predetermined amount.

Hence, the host interface 308 determines in accordance with a certain program whether to generate a signal (interrupt signal) for stopping the apparatus A from transmitting data (S7). If it is determined that no interrupt signal needs to be generated (NO at S7), then the apparatus B continues to receive data (S6). On the other hand, if it is determined that an interrupt signal needs to be generated (YES at S7), then the apparatus B generates an interrupt signal (S8).

The apparatus B transmits the interrupt signal during an extended time slot T1 in a packet scheme by which packets are transmitted through the signal line D1. Particularly, the apparatus B obtains a start position of the time slot T1 (S9), and outputs an interrupt signal with reference to the obtained start position of the time slot T1 (S10). Once the apparatus A detects the interrupt signal transmitted from the apparatus B (S11), the apparatus A stops data transmission to the apparatus B (S12).

Thereafter, the host interface 308 in the apparatus B clears the interrupt signal in a timely manner based on the free space in the buffer 306, etc., in accordance with a certain program (S13). Once the apparatus A detects the clearance of the interrupt signal (S14), the apparatus A resumes data transmission (S15). The apparatus B receives data transmitted from the apparatus A (S16). The host interface 308 determines in accordance with a certain program whether to generate an interrupt signal for stopping the apparatus A from transmitting data (S17), and appropriately generates an interrupt signal (S18). As described above, the apparatus B can appropriately stop or resume data transmission by the apparatus A.

Figure 9:
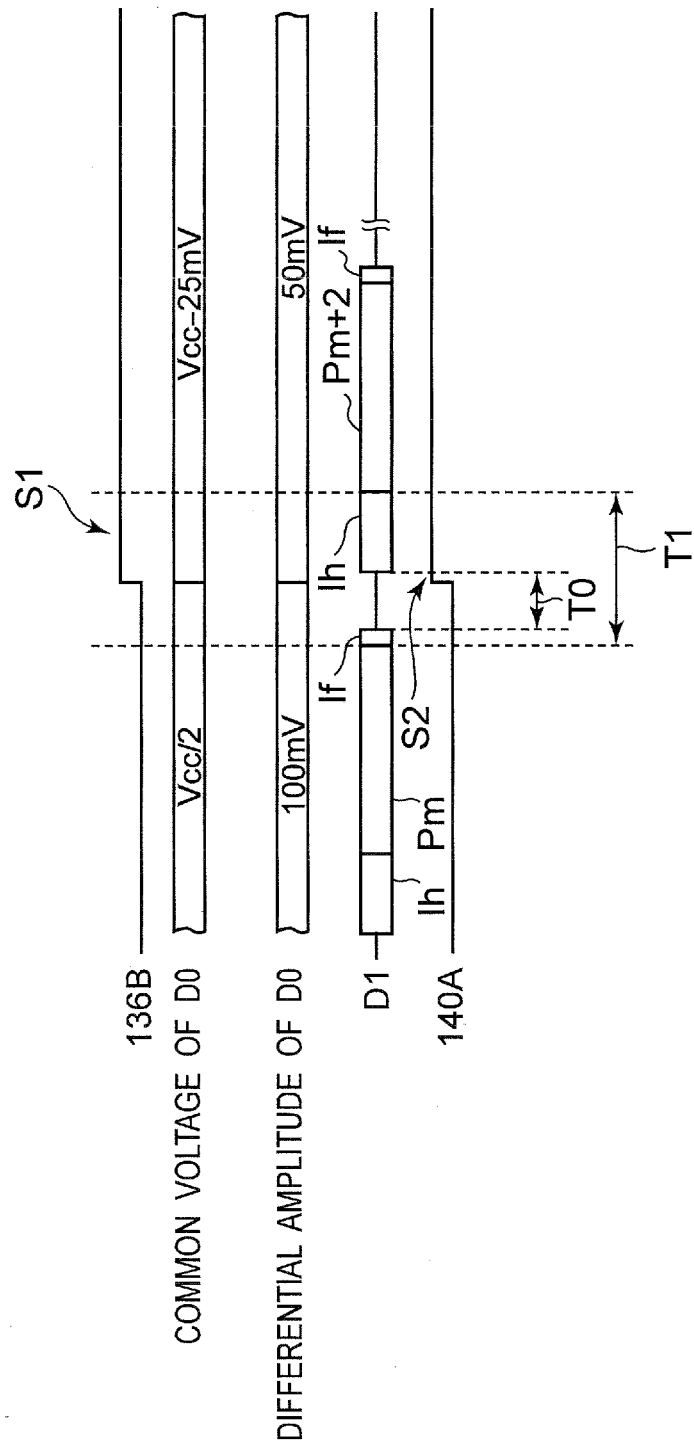
FIG. 9 is a diagram showing a change in signal for when an interrupt signal is transmitted in the data transmission system according to the first embodiment of the present invention.

FIG. 9 is a diagram illustrating a change in signal for when an interrupt signal is transmitted, and detection of the change. In the present embodiment, the mode changing unit 136B changes the apparatus B from the first mode to the second mode, and an interrupt signal is transmitted by this change. Particularly, data is transmitted in the first mode, and an interrupt signal is transmitted in the second mode.

More particularly, in order to transmit an interrupt signal, the mode changing unit 136B transmits a signal S1 for changing from the first mode to the second mode, as shown in FIG. 9. The apparatus B receives the signal S1 and changes from the first mode to the second mode. That is, the apparatus B changes from the first mode where the bridge termination resistors 114B and 116B are turned on and the pull-up resistors 126B and 128B are turned off (the mode shown in FIG. 2), to the second mode where the bridge termination resistors 114B and 116B are turned off and the pull-up resistors 126B and 128B are turned on (the mode shown in FIG. 3). Note that in the present embodiment the apparatus B transmits an interrupt signal, i.e., changes from the first mode to the second mode, during the period of the time slot T1 provided between packets of data transmitted through the signal line D1.

2.8 Detection of Interrupt Signal

As shown in FIGS. 4 to 6, in the first mode, the common voltage of the signal line D0 is Vcc/2, and the differential amplitude of the signal line D0 is 100 mV. When having changed to the second mode, the common voltage of the signal line D0 changes to (Vcc−25) mV. In addition, the differential amplitude of the signal line D0 changes from 100 mV to 50 mV. The change from the first mode (I) to the second mode (II) is done during the period of the time slot T1. The detecting unit 140A in the apparatus A detects such a change in the common voltage or in the differential amplitude of the signal line D0. Thus, the data transmission system 100 can transmit an interrupt signal from the receiving apparatus to the transmitting apparatus without providing any extra interrupt gate period between packets.

2.9 Specific Example of Mode Changing Unit

In the present embodiment, the mode changing unit 136B includes a first threshold value storage unit 162B and a second threshold value storage unit 164B, as shown in FIGS. 2 and 3. The first threshold value storage unit 162B stores a first threshold value for changing from the first mode to the second mode. The second threshold value storage unit 164B stores a second threshold value for changing from the second mode to the first mode.

Here, preferably, one of the first and second modes is set to a "receive mode" accepting reception of data from the transmitting apparatus, and the other of the first and second modes is set to an "interrupt mode" stopping reception of the data. In the present embodiment, the first mode is the "receive mode" and the second mode is the "interrupt mode". Thus, the first threshold value storage unit 162B stores the first threshold value for changing from the receive mode to the interrupt mode, and the second threshold value storage unit 164B stores the second threshold value for changing from the interrupt mode to the receive mode.

In this case, the apparatus B includes the buffer 306 (information storage element) for temporarily storing transmitted data (see FIG. 1). In this case, the first and second threshold values can be set based on the amount of data stored in the buffer 306, or based on the free space in the buffer 306.

For example, it is possible to set as the first threshold value, the amount of data (or the free space) for changing from the receive mode (first mode) to the interrupt mode (second mode). It is possible to set as the second threshold value, the amount of data (or the free space) for changing from the interrupt mode (second mode) to the receive mode (first mode). In this case, preferably, a value smaller than the first threshold value is set as the second threshold value in the case of considering the amount of data stored in the buffer 306 (or alternatively, a value greater than the first threshold value is set as the second threshold value in the case of considering the free space in the buffer 306).

Note that in the data transmission system 100 the amount of data stored in the buffer 306 has substantially the same meaning as that of the free space in the buffer 306. Setting the first and second threshold values for the amount of data stored in the buffer 306 is substantially the same as setting the first and second threshold values for the free space in the buffer 306.

In addition, in the present embodiment, the apparatus A includes a transmission control unit 142A as shown in FIGS. 2 and 3. The transmission control unit 142A controls the apparatus A so as to transmit data to the apparatus B, when detecting that the apparatus B is in the receive mode (first mode). In addition, the transmission control unit 142A stops data transmission to the apparatus B, when detecting that the apparatus B is in the interrupt mode (second mode).

Thus, when the amount of data stored in the buffer 306 or the free space in the buffer 306 reaches the first threshold value, a process of changing from the receive mode (first mode) to the interrupt mode (second mode) is performed. When the amount of data stored in the buffer 306 decreases (i.e., the free space in the buffer 306 increases) and thus reaches the second threshold value, a process of changing from the interrupt mode (second mode) to the receive mode (first mode) is performed.

Thus, the data transmission system 100 can perform the process of changing from the receive mode (first mode) to the interrupt mode (second mode) and the process of changing from the interrupt mode (second mode) to the receive mode (first mode), based on the amount of data stored in the information storage element (i.e., the buffer 306) in the receiving apparatus B (or based on the free space in the buffer 306).

As described above, the data transmission system 100 of the present embodiment can use as an interrupt signal, a change in the amplitudes or center voltage of differential signals occurring when changing between the first and second modes. Thus, an interrupt gate period does not need to be provided in a transmit signal, thus reducing degradation in transmission efficiency. In addition, since the resistance values of the bridge termination resistors and the pull-up/down resistors are matched with the characteristic impedances of the transmission lines, it is possible to prevent signal reflections in a transmission path, thus reducing degradation in signal quality.

Second Embodiment

Although the first mode is the receive mode and the second mode is the interrupt mode in the first embodiment, a data transmission system 100 is not limited to such an embodiment. For example, it is possible that the first mode is the interrupt mode, and the second mode is the receive mode. Alternatively, it is possible that one of the first and second modes is a basic mode, and the other of the first and second modes is a mode for an interrupt signal only when an interrupt signal is transmitted.

Figure 10:
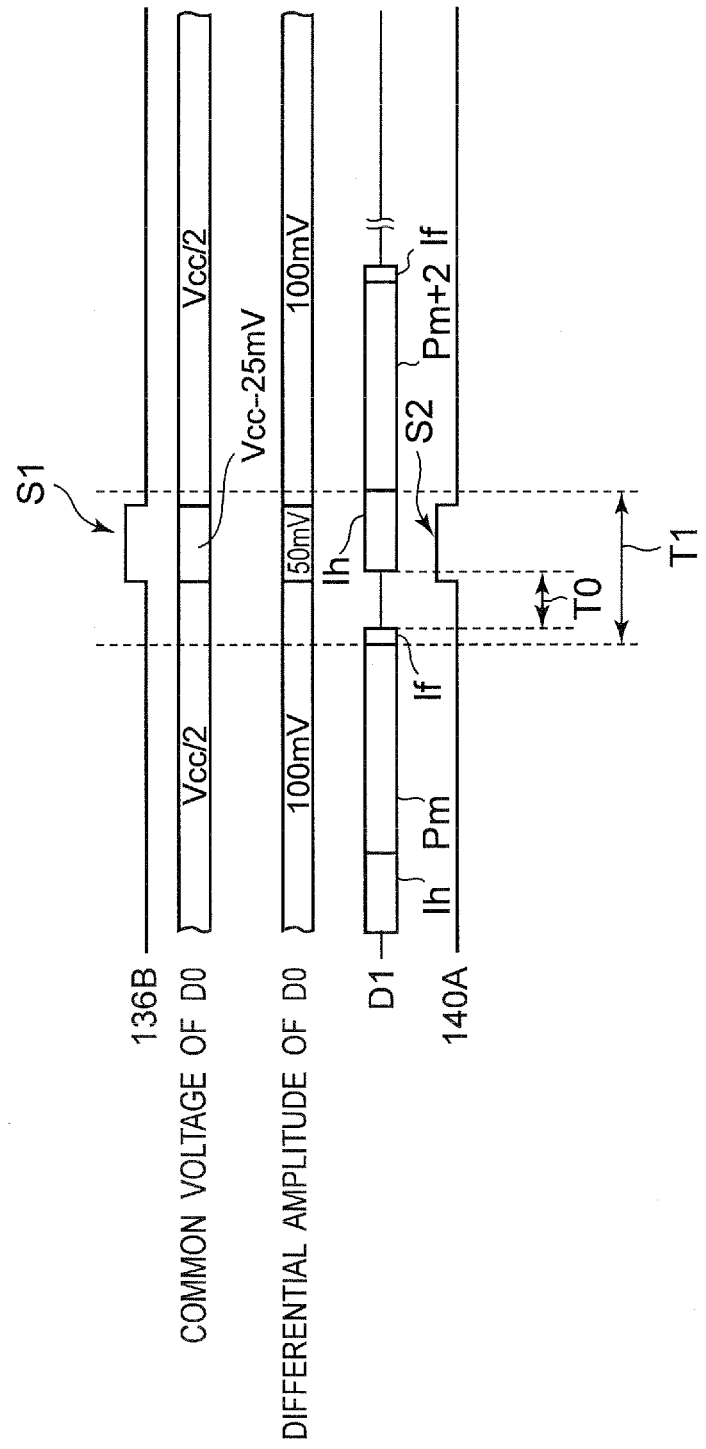
FIG. 10 is a diagram showing a change in signal for when an interrupt signal is transmitted in a data transmission system according to a second embodiment of the present invention.

In an example shown in FIG. 10, the first mode is used as the basic mode for main data transmission, and the second mode is used as the interrupt mode for transmitting interrupt signals. In this case, a mode changing unit 136B may temporarily change from the basic mode to the interrupt mode when transmitting an interrupt signal to a transmitting apparatus A.

Particularly, when an interrupt signal is transmitted, as shown in FIG. 10, the mode changing unit 136B transmits a signal S1 for temporarily changing from the first mode to the second mode, during the period of a time slot T1 provided between packets of data transmitted through a signal line D1. By the signal S1, an apparatus B is temporarily set to the second mode from the first mode during the period of the time slot T1.

As shown in FIG. 10, when the apparatus B is in the first mode, the common voltage of a signal line D0 is Vcc/2, and the differential amplitude of the signal line D0 is 100 mV. The apparatus B temporarily goes into the second mode during the period of the time slot T1. At this time, the common voltage of the signal line D0 is temporarily changed from Vcc/2 to (Vcc−25) mV. In addition, the differential amplitude of the signal line D0 is temporarily changed from 100 mV to 50 mV. In this example, a transition from the first mode to the second mode is temporarily done during the period of the time slot T1. In this case, the apparatus A detects such a change in the common voltage or in the differential amplitude of the signal line D0 by a detecting unit 140A. In the case that the common voltage or differential amplitude of the signal line D0 is kept in the changed mode for transmitting an interrupt signal, there is a possibility that differential signals are difficult to detect at the receiving apparatus due to decreases of the amplitude of the differential signals. It is possible to prevent such a problem by bringing the state of the differential signals back to its original state promptly upon completion of transmission of an interrupt signal.

As described above, an interrupt signal can be transmitted based on a temporary change in the common voltage or differential amplitude of the signal line D0. Particularly, it is possible to temporarily change from the first mode to the second mode, during the period of the time slot T1 provided between packets of data transmitted through the signal line D1. Also according to this configuration, an interrupt signal can be transmitted from the receiving apparatus to the transmitting apparatus without providing any extra interrupt gate period between packets.

Third Embodiment

In data transmission systems 100 of the above-described embodiments, the common voltage of differential signals "a" and "b" transmitted through a pair of transmission lines 104 and 106 changes as shown in FIGS. 4 and 6. In this case, though the influence is extremely limited, such a change in common voltage may generate unwanted radiation noise. Hence, capacitors may be inserted in order to cut off the influence of such a change in common voltage.

Figure 11:
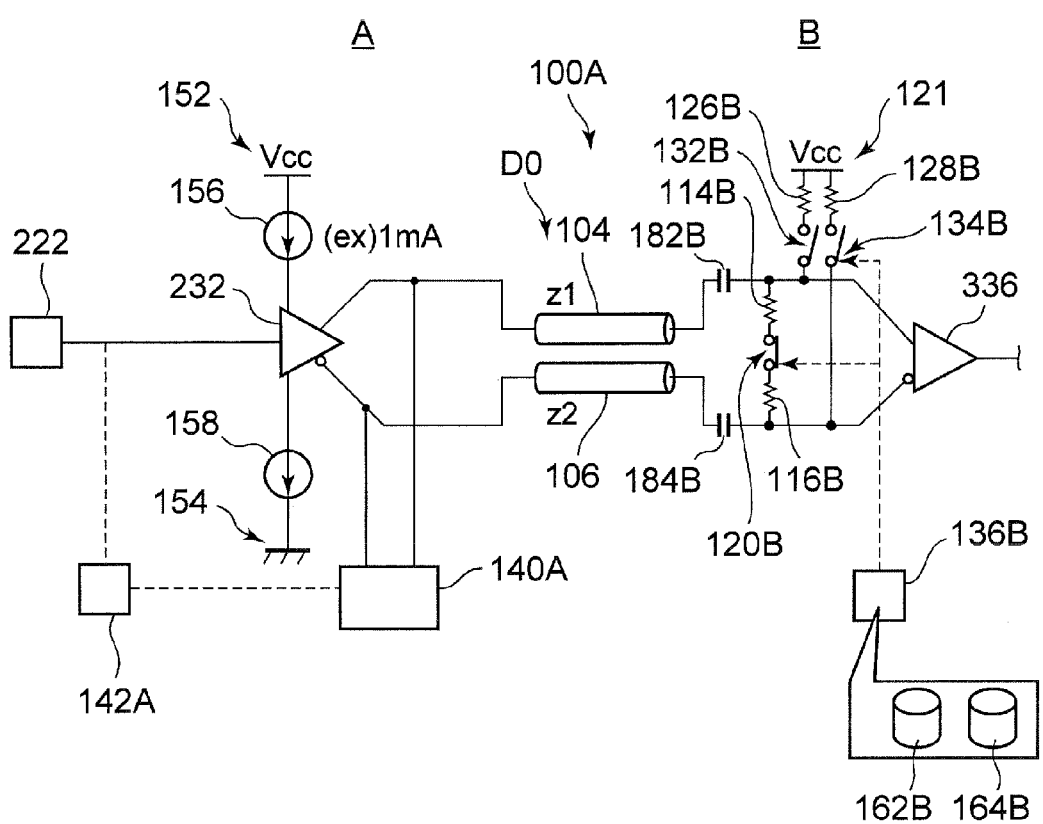
FIG. 11 is a diagram showing a data transmission system according to a third embodiment of the present invention (first mode).
Figure 12:
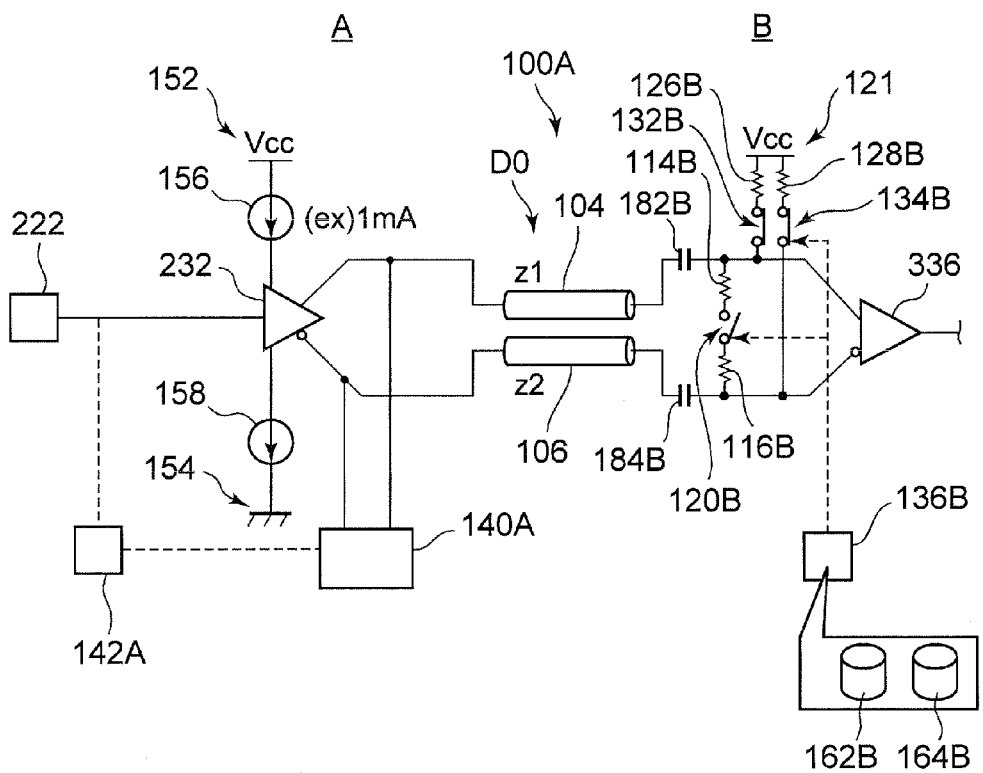
FIG. 12 is a diagram showing the data transmission system according to the third embodiment of the present invention (second mode).

FIGS. 11 and 12 are diagrams showing a data transmission system 100A in which capacitors 182B and 184B are provided in series with transmission lines 104 and 106, respectively, in an apparatus B, in order to cut off the influence of the common voltage. Such capacitors 182B and 184B cut off the direct-current components of signals.

FIG. 11 shows a first mode of the data transmission system 100A where bridge termination resistors 114B and 116B are turned on and pull-up resistors 126B and 128B are turned off. FIG. 12 shows a second mode of the data transmission system 100A where the bridge termination resistors 114B and 116B are turned off and the pull-up resistors 126B and 128B are turned on. In the present embodiment, the capacitors 182B and 184B are provided to the transmission lines 104 and 106, respectively. The capacitors 182B and 184B pass the alternating-current components of differential signals "a" and "b", but cut off their direct-current components.

Figure 13:
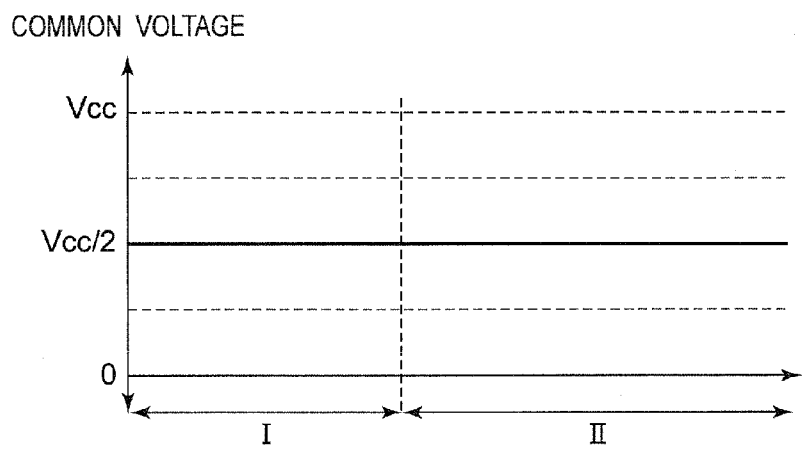
FIG. 13 is a diagram showing changes in center voltage (common voltage) in the data transmission system according to the third embodiment of the present invention.

In the data transmission system 100A, the amplitudes of the differential signals "a" and "b" change between the first and second modes. In this case, the changes in the amplitudes of the differential signals "a" and "b" are the same as those shown in FIGS. 4 and 5. On the other hand, changes in the center voltage of the differential signals "a" and "b" transmitted through a signal line D0 are cut off by the capacitors 182B and 184B. Hence, in those portions of the transmission lines 104 and 106 from the capacitors 182B and 184B to an apparatus A, it is possible to prevent changes in the common voltage of the differential signals "a" and "b" transmitted through the pair of transmission lines 104 and 106 as shown in FIG. 13. Accordingly, it is possible to prevent generation of unwanted radiation noise due to changes in the common voltage of the differential signals "a" and "b" transmitted through the pair of transmission lines 104 and 106.

Note that in an example shown in FIGS. 11 and 12, the capacitors 182B and 184B are provided at locations closer to the apparatus A than respective connecting points between the transmission lines 104 and 106 and the bridge termination resistors 114B and 116B. However, the locations of the capacitors 182B and 184B are not limited thereto. The capacitors 182B and 184B may be inserted at locations closer to the apparatus A than respective connecting points between the transmission lines 104 and 106 and the pull-up resistors 126B and 128B.

Figure 14:
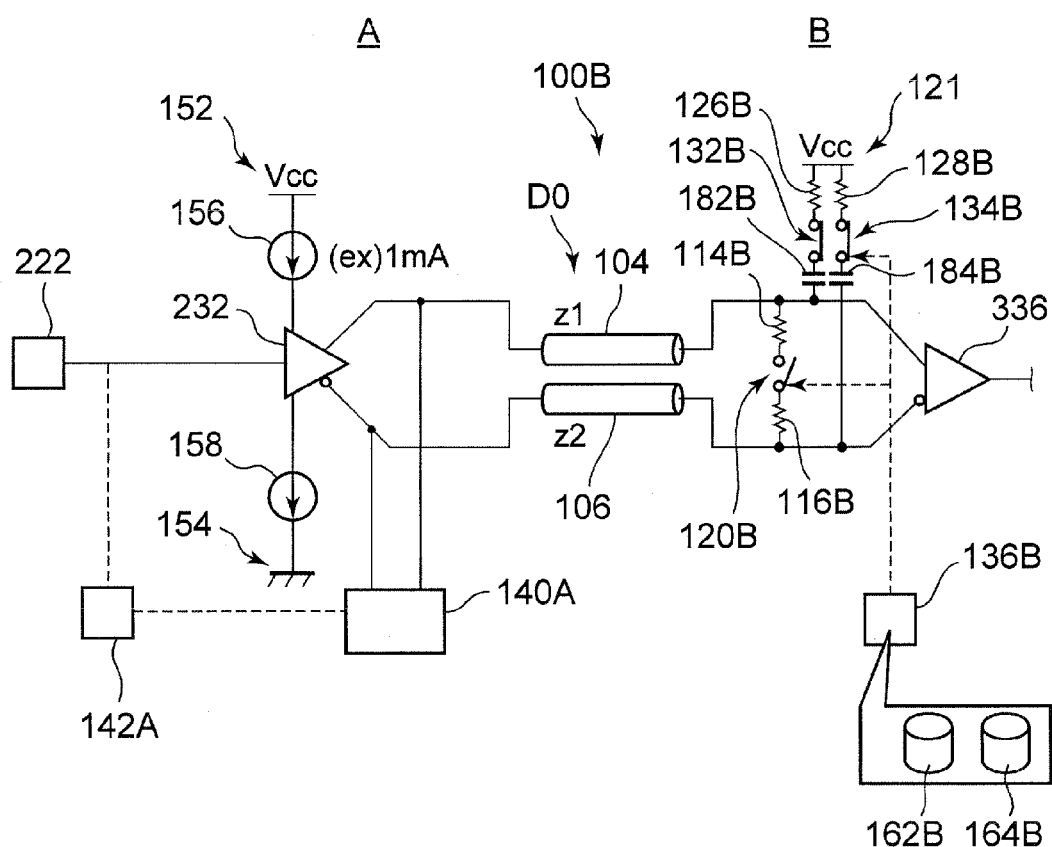
FIG. 14 is a diagram showing a variant of the data transmission system according to the third embodiment of the present invention.
Figure 15:
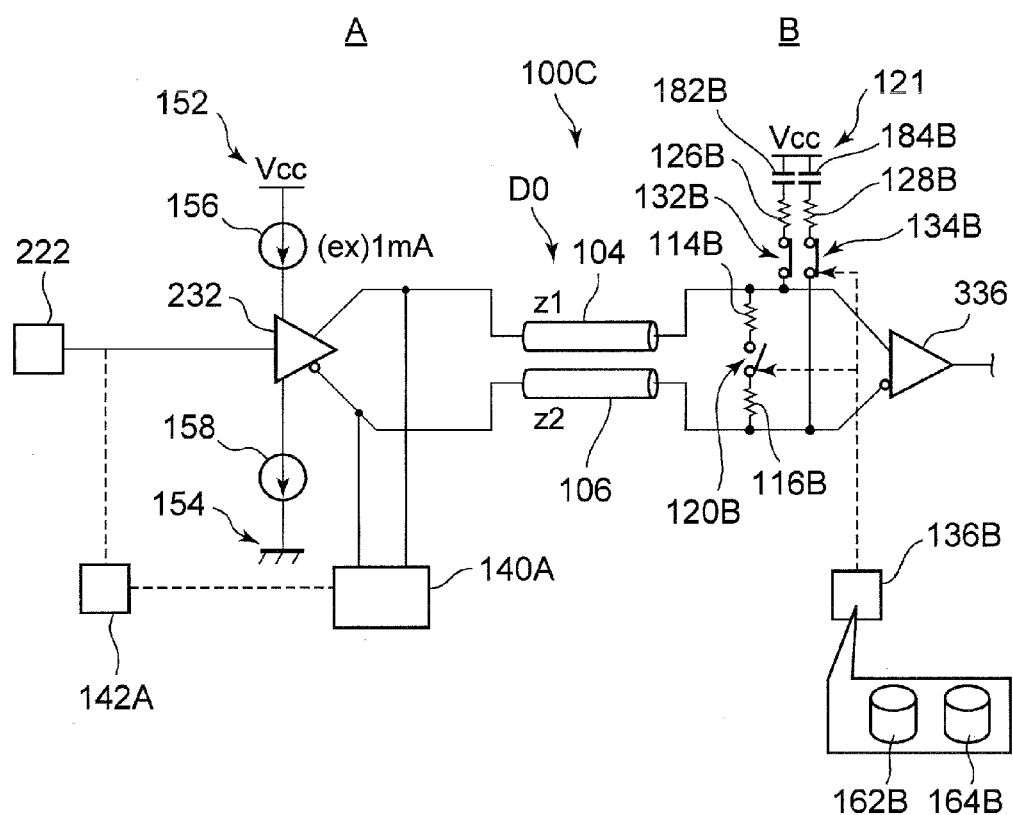
FIG. 15 is a diagram showing a variant of the data transmission system according to the third embodiment of the present invention.

Alternatively, the capacitors 182B and 184B may be provided between the transmission lines 104 and 106 and a power supply 121 to which the pull-up resistors 126B and 128B are connected. In this case, for example, capacitors 182B and 184B may be provided between second switches 132B and 134B and transmission lines 104 and 106, respectively, as shown in FIG. 14. Alternatively, for example, capacitors 182B and 184B may be provided between pull-up resistors 126B and 128B and a power supply 121, as shown in FIG. 15.

Thus, even when the capacitors 182B and 184B are respectively provided between the transmission lines 104 and 106 and the power supply 121, it is possible to prevent changes in the common voltage of differential signals transmitted through the pair of transmission lines 104 and 106, as shown in FIG. 13. Accordingly, it is possible to prevent generation of unwanted radiation noise due to changes in the common voltage of differential signals transmitted through the pair of transmission lines 104 and 106.

Fourth Embodiment

In the above-described embodiments, pull-up resistors 126B and 128B are respectively connected between transmission lines 104 and 106 and a power supply 121. In the present embodiment, an example will be described in which instead of the pull-up resistors 126B and 128B, pull-down resistors are provided between the transmission lines 104 and 106 and a ground 122. The pull-down resistors have resistance values that match the characteristic impedances of the transmission lines to which the pull-down resistors are connected, respectively.

Figure 16:
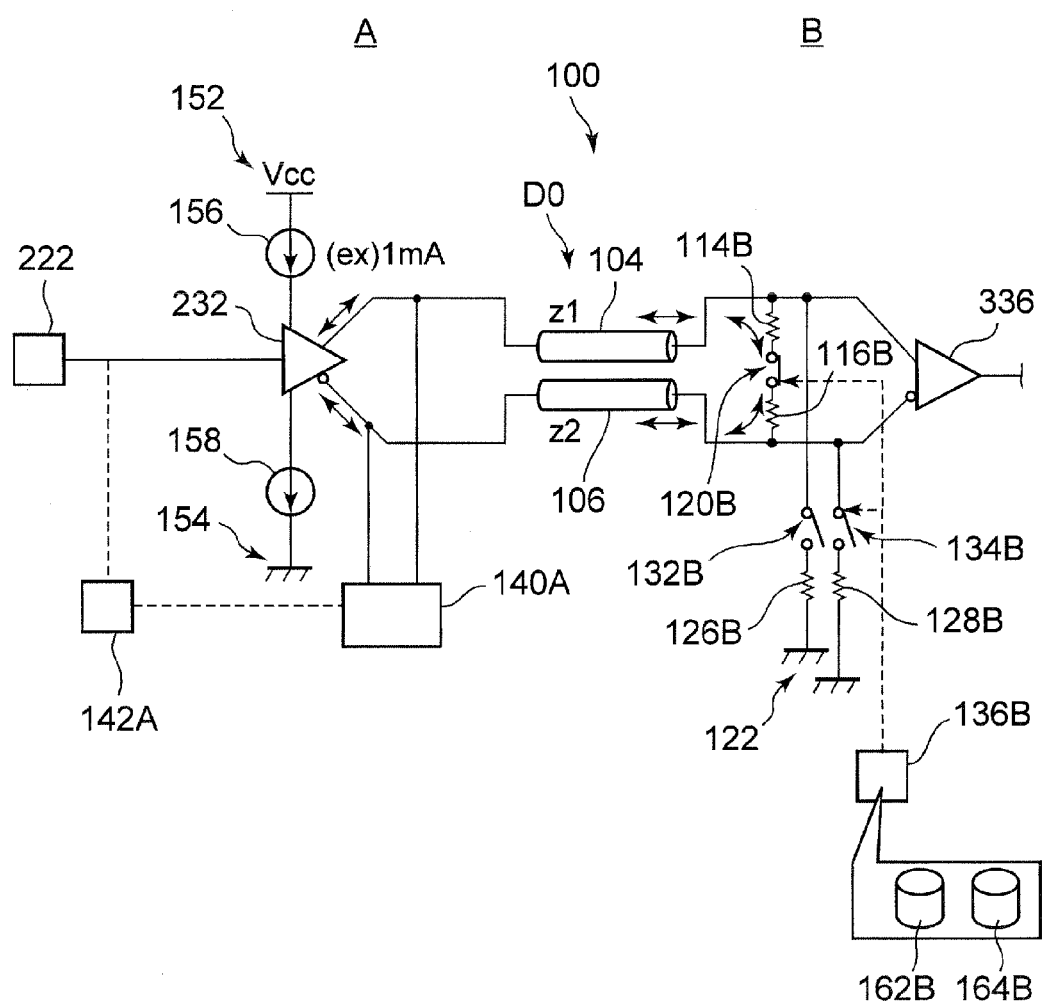
FIG. 16 is a diagram schematically showing a data transmission system according to a fourth embodiment of the present invention (first mode).
Figure 17:
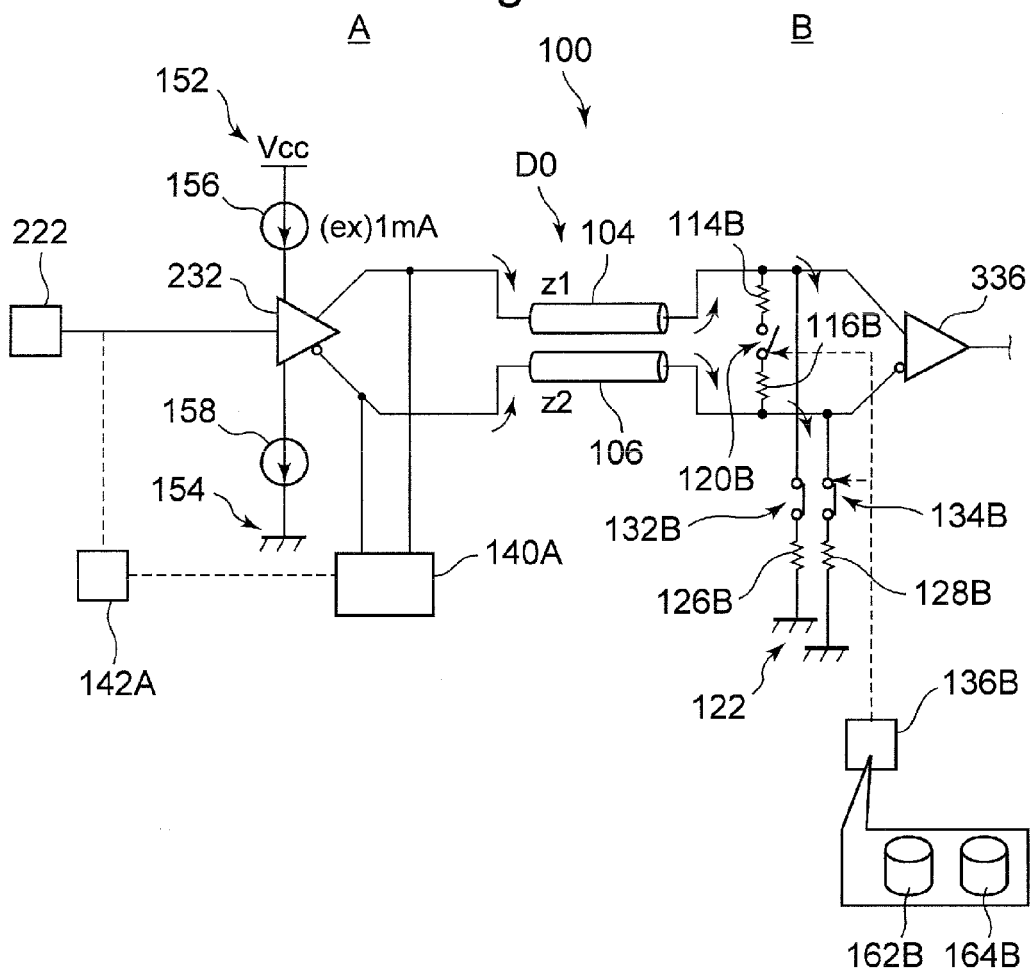
FIG. 17 is a diagram schematically showing the data transmission system according to the fourth embodiment of the present invention (second mode).

FIGS. 16 and 17 show a configuration in which pull-down resistors are provided. In the configuration shown in FIGS. 16 and 17, the amplitudes and center voltage of differential signals change between two modes, one mode is such that bridge termination resistors 114B and 116B are turned on and pull-down resistors 126B and 128B are turned off, and the other mode is such that the bridge termination resistors 114B and 116B are turned off and the pull-down resistors 126B and 128B are turned on. However, since the pull-down resistors 126B and 128B have resistance values that match the characteristic impedances of transmission lines 104 and 106, reflections of signals transmitted through the transmission lines 104 and 106 are prevented.

FIG. 16 shows a first mode obtained by connecting the bridge termination resistors 114B and 116B and disconnecting the pull-down resistors 126B and 128B. FIG. 17 shows a second mode where the bridge termination resistors 114B and 116B are turned off and the pull-down resistors 126B and 128B are turned on.

Figure 18:
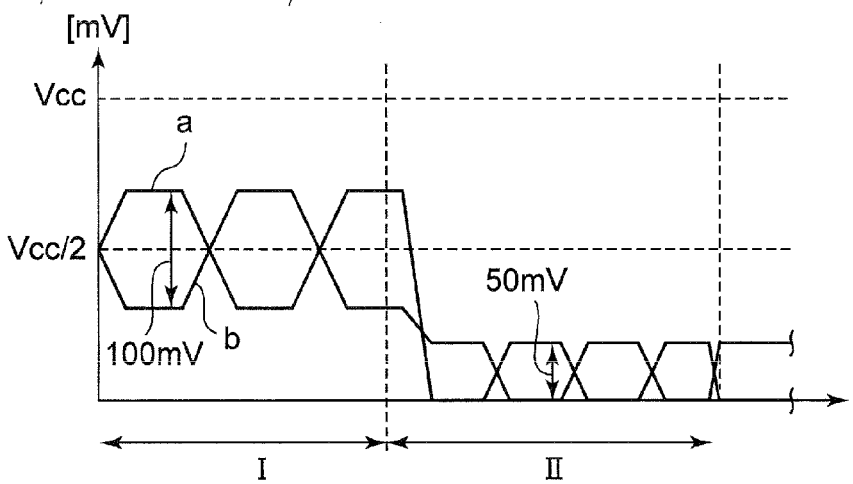
FIG. 18 is a diagram showing changes in the single-ended amplitudes of differential signals in the data transmission system according to the fourth embodiment of the present invention.
Figure 19:
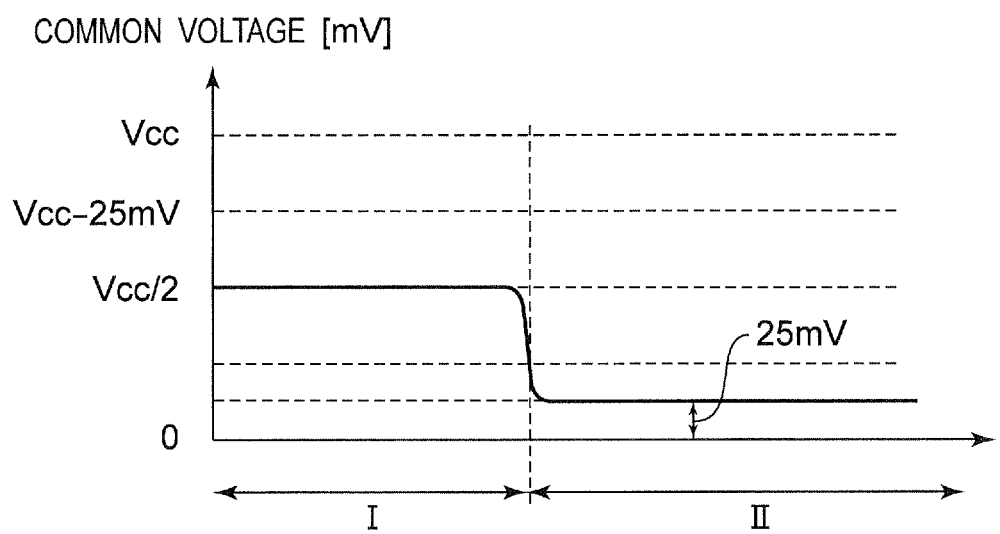
FIG. 19 is a diagram showing changes in center voltage (common voltage) in the data transmission system according to the fourth embodiment of the present invention.
Figure 20:
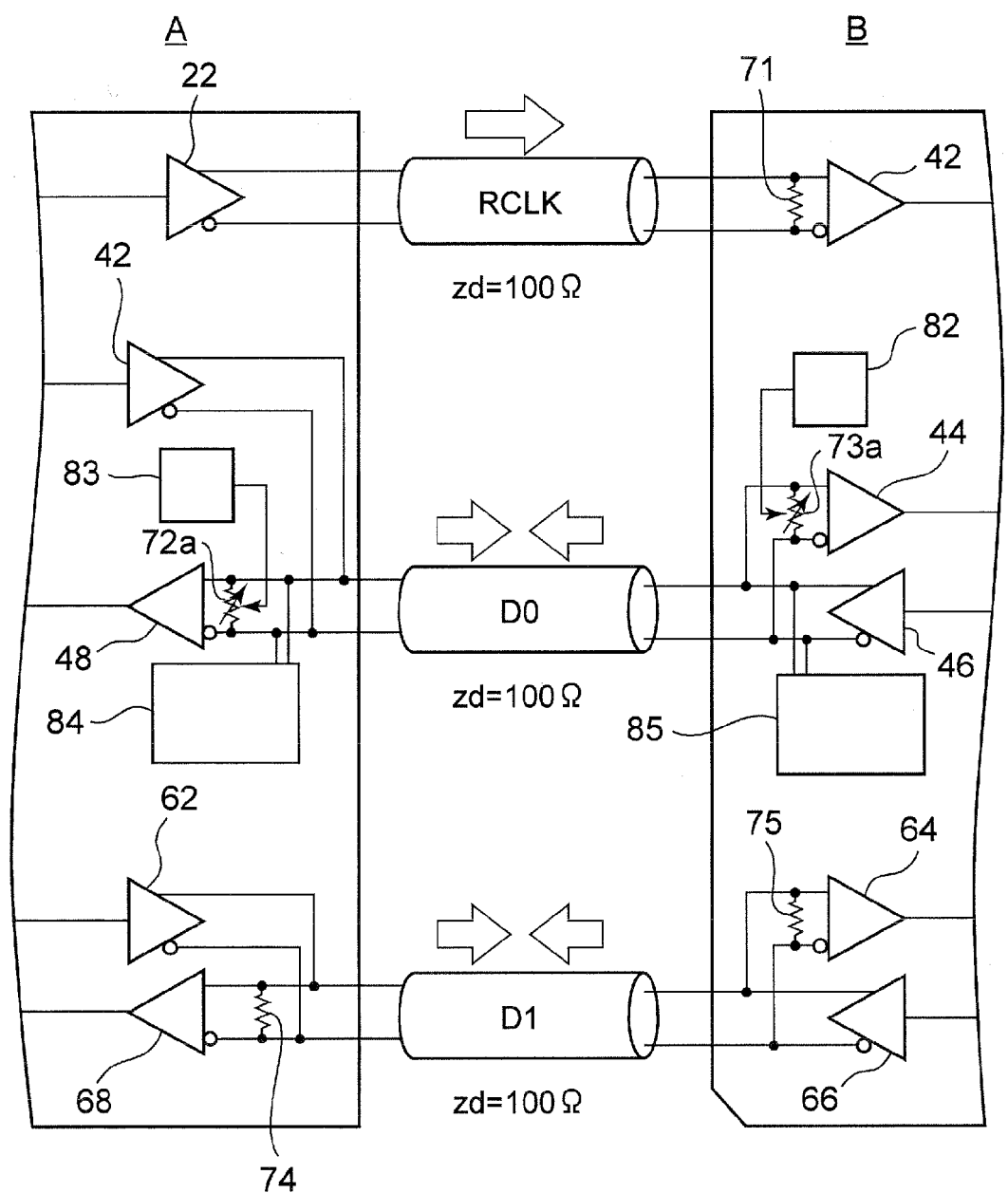
FIG. 20 is a diagram showing a data transmission system having a conventional differential scheme.

FIGS. 18 and 19 show changes in differential signals occurring in the pair of transmission lines 104 and 106. Referring to FIGS. 18 and 19, the interval indicated with "I" represents the first mode (the mode shown in FIG. 16), and the interval indicated with "II" represents the second mode (the mode shown in FIG. 17).

FIG. 18 shows changes in the single-ended amplitudes of differential signals "a" and "b" transmitted through the transmission lines 104 and 106. FIG. 19 shows changes in the center voltage (common voltage) of the differential signals "a" and "b" transmitted through the transmission lines 104 and 106. Note that changes in the differential amplitude between the differential signals "a" and "b" transmitted through the transmission lines 104 and 106 are the same as that shown in FIG. 5. The operations of the first and second modes of the data transmission system of the present embodiment will be described below.

In the first mode, when the differential signals "a" and "b" are transmitted through the transmission lines 104 and 106, respectively, a current flows through the bridge termination resistors 114B and 116B, but no current flows through the pull-down resistors 126B and 128B. This mode is the same as that shown in FIG. 2.

Suppose a case in which each characteristic impedances of the transmission lines 104 and 106 is re 50Ω, and a current of 1 mA flows through each of the transmission lines 104 and 106. In this case, preferably, the combined resistance of the bridge termination resistors 114B and 116B is 100Ω. In this case, in the first mode, the single-ended amplitudes of both the differential signals "a" and "b" are 50 mV with respect to a center voltage Vcc/2, as shown in FIG. 18 with "I". Since the differential signals "a" and "b" have opposite, positive and negative phases, the differential amplitude (a−b) of the differential signals "a" and "b" is 100 mV (see FIG. 5). The center voltage (common voltage) is Vcc/2, as shown in FIG. 19 with "I".

In the second mode, the bridge termination resistors 114B and 116B are turned off, and the pull-down resistors 126B and 128B are turned on, as shown in FIG. 17. In the present embodiment, in a transmitting apparatus A, one of the transmission lines 104 and 106 through which differential signals are transmitted is connected to a power supply 152 (Vcc), and the other of the transmission lines 104 and 106 is connected to a ground 154. In addition, two modes continuously alternate with each other at a predetermined frequency; in one mode, the transmission line 104 is connected to the power supply 152 (Vcc) and the transmission line 106 is connected to the ground 154, and in the other mode, vice versa.

When in the transmitting apparatus A the transmission line 104 or 106 is connected to the ground 154, the voltages at both ends of the transmission lines 104 and 106 become equal to the reference electric potential (0) of the grounds 154 and 122. Hence, no current flows through the transmission line 104 or 106 connected to the ground 154.

On the other hand, when in the transmitting apparatus A the transmission line 104 or 106 is connected to the power supply 152, a current flows from the power supply 152 through that transmission line 104 or 106 and through the pull-down resistors 126B and 128B in an apparatus B into the ground 122. Thus, when the bridge termination resistors 114B and 116B are turned off and the pull-down resistors 126B and 128B are turned on, a current flows through one of the transmission lines 104 and 106. Since a voltage on the other one of the transmission lines 104 and 106 becomes equal to the voltage at the grounds 154 and 122, no current flows therethrough. The transmission line through which a current flows is alternatively changed between the transmission lines 104 and 106 according to the signal cycle.

The resistance values of the pull-down resistors 126B and 128B respectively match the characteristic impedances of the transmission lines 104 and 106. Hence, reflections of the signals "a" and "b" transmitted through the transmission lines 104 and 106 are prevented.

As shown in FIG. 18 with "II", the signal voltage on one of the pair of transmission lines 104 and 106 that is connected to the ground 154 in the transmitting apparatus A is equal to the reference electric potential (i.e., 0). On the other hand, on the other transmission line connected to the power supply 152 in the apparatus A, a current flows from the power supply 152 (Vcc) of the apparatus A into the ground 122 through that transmission line 104 or 106 and through one of the pull-down resistors 126B and 128B connected to that transmission line.

Suppose a case in which each characteristic impedance of the transmission lines 104 and 106 is 50Ω, and a current of 1 mA flows through the transmission lines 104 and 106. Since the resistance values of the pair of pull-down resistors 126B and 128B match the characteristic impedances of the transmission lines 104 and 106 to which the pull-down resistors 126B and 128B are connected, respectively, each resistance value of the pull-down resistors 126B and 128B is also 50Ω.

In the second mode, the bridge termination resistors 114B and 116B are turned off, and the pull-down resistors 126B and 128B are turned on, as shown in FIG. 17. In this case, one of the voltages of the differential signals "a" and "b" transmitted through the pair of transmission lines 104 and 106 is equal to the reference electric potential (0), and the other is equal to the reference electric potential (0) plus 50 mV, as shown in FIG. 18 with "II". Hence, the differential amplitude (a–b) is 50 mV, as in that shown in FIG. 5 with "II". The center voltage (common voltage) is +25 mV, as shown in FIG. 19 with "II".

As described above, according to the present embodiment, the characteristic impedances of the transmission lines 104 and 106 respectively match the bridge termination resistors 114B and 116B and the pull-down resistors 126B and 128B in both the first and second modes. Hence, in both the first mode "I" and the second mode "II", reflections of signals transmitted through the pair of transmission lines 104 and 106 are prevented, and thus, unwanted radiation noise due to signal reflections is less likely to be generated.

According to the data transmission system 100, the amplitudes and center voltage of the differential signals "a" and "b" change between the first mode "I" and the second mode "II", as shown in FIGS. 5, 18, and 19. Particularly, according to the above-described example, in the first mode "I", the amplitudes of the differential signals "a" and "b" are 50 mV, the differential amplitude (a–b) is 100 mV, and the center voltage (common voltage) is Vcc/2. On the other hand, in the second mode "II", the amplitudes of the differential signals "a" and "b" are 25 mV, the differential amplitude (a–b) is 50 mV, and the center voltage (common voltage) is 25 mV. Thus, since the differential amplitude and center voltage of the differential signals "a" and "b" change depending on the mode, the change in the differential amplitude or center voltage of the differential signals "a" and "b" can be used as an interrupt signal.

Note that, in the embodiment shown in FIGS. 16 and 17, a receiver 336 in the apparatus B has the reception characteristics capable of correctly receiving signals even if the differential amplitude changes between the first and second modes. Hence, data can be transmitted in both the first mode (the mode in FIG. 16) and the second mode (the mode in FIG. 17). Accordingly, it is possible to use one of the first and second modes as a mode for data transmission, and the other as a mode for an interrupt signal.

In addition, the common voltage of the differential signals "a" and "b" changes also due to the pull-down resistors 126B and 128B connected between the transmission lines 104 and 106 and the ground 122. In this case, though the influence is extremely limited, the change in common voltage may generate unwanted radiation noise. Thus, capacitors may be provided in order to eliminate the influence of the change in common voltage. The capacitors may be inserted in series with the transmission lines 104 and 106 as shown in FIG. 11. Alternatively, the capacitors may be inserted between the transmission lines 104 and 106 and the ground 122 according to the same approach as that in FIGS. 14 and 15. Thus, as with the case shown in FIG. 13, it is possible to prevent changes in the common voltage of the differential signals "a" and "b" when changing between the first mode (I) and the second mode (II).

Thus, the data transmission system 100 may include pull-up resistors connecting the transmission lines 104 and 106 to the power supply 121 as in the first embodiment (FIG. 2), or may include pull-down resistors connecting the transmission lines 104 and 106 to the ground 122 as in the present embodiment (FIG. 16).

Other Embodiments

Although various variants of the data transmission system 100 according to the embodiments of the present invention are described above, the scope of the present invention is not limited to the disclosed contents of the above-described various embodiments, and furthermore, the following variants are also considered.

The above-described embodiments only illustrate configurations Used for transmitting data from an apparatus A to an apparatus B, with reference to FIG. 2, 11, or 16, etc. Data may be transmitted from the apparatus B to the apparatus A. In this case, it may be necessary to transmit an interrupt signal from the apparatus A to the apparatus B. In order to achieve the transmission of an interrupt signal from the apparatus A to the apparatus B, the apparatus A may be provided with bridge termination resistors 114B and 116B, pull-up resistors or pull-down resistors 126B and 128B, a mode changing unit 136B, and capacitors 182B and 184B which are provided in the apparatus B. In addition, the apparatus B may be provided with a detecting unit 140A provided in the apparatus A.

Although the above-described embodiments illustrate examples in which an interrupt signal is transmitted through a signal line D0, with reference to FIG. 2, 11, or 16, it is also possible to transmit an interrupt signal through a signal line D1 using a similar configuration. In addition, with respect to the signal line D1, it is also possible to provide a configuration capable of transmitting an interrupt signal not only from the apparatus B, but also from the apparatus A.

For example, the specific configurations of the apparatuses A and B are not limited to those described above. For example, according to the above-described embodiments, the apparatuses A and B are connected to each other by three signal lines RCLK, D0, and D1. The number and form of signal lines connecting the apparatus A to the apparatus B are not limited to those in the above-described embodiments. The specific configurations of the apparatuses A and B are also not limited to those described above.

Although the above-described embodiments illustrate the case in which the apparatus A is a host terminal, the type of the apparatus A is not limited thereto. In addition, although the case in which the apparatus B is a removable memory card is illustrated, the type of the apparatus B is not limited thereto. The present data transmission system can be applied to a plurality of various apparatuses communicating data with each other. The present data transmission system can be applied to various information terminals and information apparatuses. In recent years, various electrical appliances, in-vehicle apparatuses, etc., have been diversified, and a system may be constructed in which the appliances or apparatuses exchange information and work in cooperation with each other. Also in such a case, an information terminal or an information apparatus is installed in each apparatus. The present data transmission system can be applied to the information terminals or the information apparatus, as a system for high-speed data transmission.

CONCLUSION

Data transmission systems 100 described in the above-described embodiments can appropriately change between a first mode (the mode shown in FIG. 2 or 16) and a second mode (the mode shown in FIG. 3 or 17) when transmitting a pair of differential signals of opposite phases through a pair of transmission lines 104 and 106 connecting a plurality of apparatuses A and B communicating data with each other. According to such data transmission systems, since the amplitudes and center voltage of the differential signals change between the first and second modes, such a change in the amplitudes or center voltage of the differential signals can be used as an interrupt signal.

In this case, the resistance values of bridge termination resistors 114B and 116B match a differential impedance of the pair of transmission lines 104 and 106. In addition, the resistance values of pull-up resistors or pull-down resistors 126B and 128B respectively match the characteristic impedances of the transmission lines 104 and 106. Hence, it is possible to prevent generation of unwanted radiation noise due to reflections of the signals transmitted through the pair of transmission lines 104 and 106.

Thus, the data transmission systems 100 can prevent the generation of unwanted radiation noise due to reflections of signals transmitted through the pair of transmission lines 104 and 106 when transmitting an interrupt signal. In addition, no extra time slot needs to be provided in order to transmit an interrupt signal, thus improving data transmission efficiency.

In addition, apparatuses (hereinafter, referred to as the "information processing apparatuses") A and B having a data transmission system 100 described in each of the above-described embodiments include, as shown in FIG. 1, 2, or 16, a connecting unit 400 connected to another apparatus; a pair of transmission lines 104 and 106 provided in the connecting unit 400; bridge termination resistors 114B and 116B connected between the pair of transmission lines 104 and 106 and having resistance values that match a differential impedance of the pair of transmission lines 104 and 106; a first switch 120B that connects the bridge termination resistors 114B and 116B to the pair of transmission lines 104 and 106 when being turned on, and that disconnects the bridge termination resistors 114B and 116B from the pair of transmission lines 104 and 106 when being turned off; pull-up resistors/pull-down resistors 126B and 128B respectively connected between the transmission lines 104 and 106 and either one of a power supply 121 and a ground 122, and having resistance values that respectively match the characteristic impedances of the transmission lines 104 and 106; and second switches 132B and 134B that connect the pull-up resistors or the pull-down resistors 126B and 128B between the pair of transmission lines 104 and 106 and either one of the power supply 121 and the ground 122 when being turned on, and that disconnects the pull-up resistors or the pull-down resistors 126B and 128B from the pair of transmission lines 104 and 106 when being turned off.

The information processing apparatuses A and B having such a configuration can obtain the same effects as those obtained by the above-described data transmission systems 100. Particularly, the information processing apparatuses A and B can change the amplitudes and center voltage of differential signals "a" and "b" transmitted through the pair of transmission lines 104 and 106, by changing between the first and second modes. Thus, the change in the amplitudes or center voltage of the differential signals "a" and "b" can be used as an interrupt signal. Hence, it is possible to transmit an interrupt signal from the receiving apparatus to the transmitting apparatus without providing any extra interrupt gate period between packets. In addition, when transmitting an interrupt signal, it is possible to prevent reflections occurring in signals transmitted through the pair of transmission lines 104 and 106.

Furthermore, the information processing apparatuses A and B may include a mode changing unit 136B that changes between the first mode where the first switch 120B is turned on and the second switches 132B and 134B are turned off, and the second mode where the first switch 120B is turned off and the second switches 132B and 134B are turned on. The information processing apparatuses A and B can be appropriately changed between the first and second modes using the mode changing unit 136B.

In addition, the information processing apparatuses A and B may be provided with capacitors 182B and 184B, in series with the transmission lines 104 and 106, or between the transmission lines 104 and 106 and either one of the power supply 121 and the ground 122. According to this configuration, when changing between the first and second modes, while the amplitudes of the differential signals "a" and "b" transmitted through the pair of transmission lines 104 and 106 are changed, it is possible to prevent changes the center voltage of the differential signals "a" and "b". Thus, when changing between the first and second modes, it is possible to prevent generation of noise due to changes in the center voltage of the differential signals "a" and "b".

In addition, the information processing apparatus A or B may include a detecting unit 140A for detecting whether the other apparatus is in the first mode or in the second mode, based on a change in the states of the pair of differential signals "a" and "b" transmitted through the pair of transmission lines 104 and 106. Thus, the information processing apparatus A or B can appropriately detect whether the other apparatus connected thereto is in the first mode or in the second mode.

In addition, a data transmission method embodied by the data transmission systems 100 is to appropriately change between a first mode where a pair of transmission lines 104 and 106 are connected to bridge termination resistors 114B and 116B, and a second mode where the pair of transmission lines 104 and 106 are connected to pull-up resistors or pull-down resistors 126B and 128B, respectively, as described above. The bridge termination resistors 114B and 116B have resistance values that match a differential impedance of the pair of transmission lines 104 and 106. The pull-up resistors 126B and 128B are respectively connected between the transmission lines 104 and 106 and a power supply 121, and have resistance values that respectively match the characteristic impedances of the transmission lines 104 and 106 (see FIG. 3). The pull-down resistors 126B and 128B are connected between the transmission lines 104 and 106 and a ground 122, and have resistance values that respectively match the characteristic impedances of the transmission lines 104 and 106 (see FIG. 17).

According to the present data transmission method, it is possible to change the amplitudes and center voltage of differential signals "a" and "b" transmitted through the pair of transmission lines 104 and 106 by changing between the first and second modes. Then, the change in the amplitudes or center voltage of the differential signals "a" and "b" can be used as an interrupt signal. According to the present data transmission method, it is possible to transmit an interrupt signal from the receiving apparatus to the transmitting apparatus without providing any extra interrupt gate period between packets. In addition, when transmitting an interrupt signal, it is possible to prevent reflections occurring in signals transmitted through the pair of transmission lines 104 and 106.

INDUSTRIAL APPLICABILITY

The present invention is useful for a data transmission system used in information terminals or information apparatuses that require high-speed data transmission.

REFERENCE SIGNS LIST 100, 100A, 100B, and 100C: DATA TRANSMISSION SYSTEM
104 and 106: TRANSMISSION LINE
114A, 114B, 116A, and 116B: BRIDGE TERMINATION RESISTOR
120A and 120B: FIRST SWITCH
121: POWER SUPPLY
122: GROUND
126A, 126B, 128A, and 128B: PULL-UP RESISTOR OR PULL-DOWN RESISTOR
132A, 132B, 134A, and 134B: SECOND SWITCH
136B: MODE CHANGING UNIT
140A: DETECTING UNIT
142A: TRANSMISSION CONTROL UNIT
162B: FIRST THRESHOLD VALUE STORAGE UNIT
164B: SECOND THRESHOLD VALUE STORAGE UNIT
a and b: DIFFERENTIAL SIGNAL
A: HOST TERMINAL
B: REMOVABLE MEMORY CARD

The invention claimed is:

1. A data transmission system comprising a first apparatus transmitting data, a second apparatus receiving the data, and a pair of transmission lines connecting the first and second apparatuses, the second apparatus comprising:
a bridge termination resistor connected between the pair of transmission lines and having a resistance value that matches a differential impedance of the pair of transmission lines;
a first switch that connects the bridge termination resistor to the pair of transmission lines when being turned on, and that disconnects the bridge termination resistor from the pair of transmission lines when being turned off;
pull-up/down resistors connected between the transmission lines and a fixed voltage node, and having resistance values that respectively match characteristic impedances of the transmission lines, the fixed voltage node being either one of a power supply and a ground; and
second switches that connect the pull-up/down resistors between the pair of transmission lines and the fixed voltage node when being turned on, and that disconnects the pull-up/down resistors from the pair of transmission lines when being turned off.

2. The data transmission system according to claim 1, wherein the second apparatus comprises a mode changing unit that changes between a first mode in which the first switch is turned on and the second switches are turned off, and a second mode in which the first switch is turned off and the second switches are turned on.

3. The data transmission system according to claim 2, wherein the first apparatus comprises a detecting unit for detecting whether the second apparatus is in the first mode or in the second mode, based on a change in states of a pair of differential signals transmitted through the pair of transmission lines.

4. The data transmission system according to claim 3, wherein the detecting unit includes an amplitude detecting unit for detecting a differential amplitude of the differential signals transmitted through the pair of transmission lines.

5. The data transmission system according to claim 3, wherein the detecting unit includes a center voltage detecting unit for detecting a center voltage of the differential signals transmitted through the pair of transmission lines.

6. The data transmission system according to claim 3, wherein one of the first and second modes is a receive mode in which the second apparatus accepts reception of data from the first apparatus, and the other of the first and second modes is an interrupt mode in which the second apparatus stops reception of data.

7. The data transmission system according to claim 6, wherein the mode changing unit includes:
a first threshold value storage unit that stores a first threshold value for changing from the receive mode to the interrupt mode; and
a second threshold value storage unit that stores a second threshold value for changing from the interrupt mode to the receive mode.

8. The data transmission system according to claim 7, wherein the second apparatus further comprises an information recording medium temporarily storing transmitted data,
wherein the first and second threshold values are set based on an amount of data stored in the information recording medium or based on free space in the information recording medium.

9. The data transmission system according to claim 8, wherein a value of the amount of data stored in the information storage medium, for changing from the receive mode to the interrupt mode, is set as the first threshold value, and
wherein a value of the amount of data stored in the information storage medium, being smaller than the first threshold value, is set as the second threshold value.

10. The data transmission system according to claim 8,
wherein a value of the free space in the information storage medium, for changing from the receive mode to the interrupt mode, is set as the first threshold value, and
wherein a value of the free space in the information storage medium, being greater than the first threshold value, is set as the second threshold value.

11. The data transmission system according to claim 6,
wherein the first apparatus further comprises a transmission control unit that transmits data to the second apparatus when the detecting unit has detected that the second apparatus is in the receive mode, and that stops data transmission to the second apparatus when the detecting unit has detected that the second apparatus is in the interrupt mode.

12. The data transmission system according to claim 2,
wherein a capacitor is inserted in series with the transmission line.

13. The data transmission system according to claim 2,
wherein a capacitor is inserted between the transmission line and either one of the power supply and the ground.

14. The data transmission system according to claim 2,
wherein the mode changing unit includes:
a first threshold value storage unit that stores a first threshold value for changing from the first mode to the second mode; and
a second threshold value storage unit that stores a second threshold value for changing from the second mode to the first mode.

15. The data transmission system according to claim 2,
wherein one of the first and second modes is a basic mode, and the other of the first and second modes is an interrupt mode, and
wherein the mode changing unit temporarily changes from the basic mode to the interrupt mode when the second apparatus transmits an interrupt signal to the first apparatus.

16. The data transmission system according to claim 1,
wherein the bridge termination resistor and the first switch are composed of a transistor.

17. The data transmission system according to claim 1,
wherein the pull-up/down resistor and the second switch are composed of a transistor.

18. An information processing apparatus for communicating data with other apparatus, the information processing apparatus comprising:
a connecting unit that connects the information processing apparatus to the other apparatus;
a pair of transmission lines provided in the connecting unit;
a bridge termination resistor connected between the pair of transmission lines and having a resistance value that matches a differential impedance of the pair of transmission lines;
a first switch that connects the bridge termination resistor to the pair of transmission lines when being turned on, and that disconnects the bridge termination resistor from the pair of transmission lines when being turned off;
pull-up/down resistors connected between the transmission lines and a fixed voltage node, and having resistance values that respectively match characteristic impedances of the transmission lines, the fixed voltage node being either one of a power supply and a ground; and
second switches that connect the pull-up/down resistors between the pair of transmission lines and the fixed voltage node when being turned on, and that disconnects the pull-up/down resistors from the pair of transmission lines when being turned off.

19. The information processing apparatus according to claim 18,
wherein a capacitor is inserted in series with the transmission line.

20. The information processing apparatus according to claim 19, further comprising a mode changing unit that changes between a first mode in which the first switch is turned on and the second switches are turned off, and a second mode in which the first switch is turned off and the second switches are turned on.

21. The information processing apparatus according to claim 20, further comprising a detecting unit for detecting whether the other apparatus is in the first mode or in the second mode, based on a change in states of a pair of differential signals transmitted through the pair of transmission lines.

22. The information processing apparatus according to claim 18,
wherein a capacitor is inserted between the transmission line and either one of the power supply and the ground.

23. A data transmission method for transmitting a pair of differential signals of opposite phases through a pair of transmission lines connecting a plurality of apparatuses communicating data with each other, the data transmission method comprising:
transmitting the pair of differential signals; and
selectively changing between a first mode and a second mode;
wherein the first mode comprises electrically connecting a bridge termination resistor between the pair of transmission lines;
wherein the second mode comprises electrically connecting pull-up/down resistors between the transmission lines and either one of a power supply and a ground; and
wherein the bridge termination resistor has a resistance value that matches a differential impedance of the pair of transmission lines, and the pull-up/down resistors have resistance values that match characteristic impedances of the transmission lines.

* * * * *